(12) United States Patent
Lee et al.

(10) Patent No.: US 12,052,473 B2
(45) Date of Patent: Jul. 30, 2024

(54) IMAGE DISPLAY DEVICE AND METHOD FOR CONTROLLING THE SAME

(71) Applicant: LG ELECTRONICS INC., Seoul (KR)

(72) Inventors: Eunjung Lee, Seoul (KR); Minjae Kim, Seoul (KR); Sijin Kim, Seoul (KR); Taeyoung Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 480 days.

(21) Appl. No.: 17/312,041

(22) PCT Filed: Jan. 15, 2019

(86) PCT No.: PCT/KR2019/000583
§ 371 (c)(1),
(2) Date: Jun. 9, 2021

(87) PCT Pub. No.: WO2020/149426
PCT Pub. Date: Jul. 23, 2020

(65) Prior Publication Data
US 2022/0030319 A1    Jan. 27, 2022

(51) Int. Cl.
*H04N 7/18* (2006.01)
*G06F 3/14* (2006.01)
(Continued)

(52) U.S. Cl.
CPC ..... *H04N 21/47217* (2013.01); *G06F 3/1454* (2013.01); *G06F 3/162* (2013.01); *H04N 21/43637* (2013.01)

(58) Field of Classification Search
CPC ....... H04N 21/47217; H04N 21/43637; H04N 21/4126; H04N 21/42203; H04N 21/4825;
(Continued)

(56) References Cited

U.S. PATENT DOCUMENTS 9,041,735 B2 * 5/2015 Choi ............... G06F 3/0481
345/2.1
10,127,002 B2 * 11/2018 Glazer ............. G06F 3/1454
(Continued)

FOREIGN PATENT DOCUMENTS

KR    10-2017-0011763 A    2/2017
WO    WO 2017/022931 A1    2/2017

*Primary Examiner* — Jeffery F Harold
*Assistant Examiner* — Sahar Aqil Riaz
(74) *Attorney, Agent, or Firm* — Birch, Stewart, Kolasch & Birch, LLP

(57) ABSTRACT

The present invention is to provide an image display device capable of performing various functions in association with a mobile terminal such as a smartphone or the like, and a method for controlling the same. The image display device includes a display unit, an audio output unit, a wireless communication module for a communication between a mobile terminal and a remote controller, a controller that perform control to establish a first communication connection with the mobile terminal in response to a first communication connection request received through the wireless communication module from the mobile terminal playing first content, receive the first content from the mobile terminal through a first communication and output the first content through the audio output unit, and display a user interface for controlling playback of the first content of the mobile terminal on the display unit.

16 Claims, 23 Drawing Sheets

(51) Int. Cl.
*G06F 3/16* (2006.01)
*H04N 21/4363* (2011.01)
*H04N 21/472* (2011.01)

(58) Field of Classification Search
CPC ... H04N 21/8113; G06F 3/1454; G06F 3/162;
G06F 3/165; G06F 3/167; G06Q 30/0631;
G09G 2354/00; G09G 2370/16
USPC .......................................................... 725/74
See application file for complete search history.

(56) References Cited

U.S. PATENT DOCUMENTS

| | | | | |
|---|---|---|---|---|
| 10,897,489 | B2 * | 1/2021 | Simotas | H04L 67/563 |
| 2008/0125172 | A1 * | 5/2008 | Leon | H04L 67/04 |
| | | | | 455/557 |
| 2010/0231790 | A1 * | 9/2010 | Ansari | H04L 63/0876 |
| | | | | 715/825 |
| 2010/0262909 | A1 * | 10/2010 | Hsieh | G10L 25/48 |
| | | | | 707/E17.009 |
| 2012/0054803 | A1 * | 3/2012 | Lee | H04N 21/4312 |
| | | | | 725/56 |
| 2012/0274661 | A1 * | 11/2012 | Ye | G06F 3/0481 |
| | | | | 345/629 |
| 2013/0027289 | A1 * | 1/2013 | Choi | H04N 21/4222 |
| | | | | 345/156 |
| 2014/0267910 | A1 | 9/2014 | Chugh et al. | |
| 2016/0100277 | A1 * | 4/2016 | Barabas | H04W 4/80 |
| | | | | 455/41.3 |
| 2016/0360287 | A1 * | 12/2016 | Van | H04N 21/44204 |
| 2017/0026686 | A1 * | 1/2017 | Glazier | H04N 21/41407 |
| 2017/0150227 | A1 * | 5/2017 | Kim | G06Q 20/326 |
| 2018/0070122 | A1 * | 3/2018 | Baek | H04N 21/4438 |
| 2023/0140108 | A1 * | 5/2023 | Perlman | G09G 5/006 |
| | | | | 345/2.3 |

\* cited by examiner

IMAGE DISPLAY DEVICE AND METHOD FOR CONTROLLING THE SAME

CROSS REFERENCE TO RELATED APPLICATIONS

This application is the National Phase of PCT International Application No. PCT/KR2019/000583, filed on Jan. 15, 2019, which is hereby expressly incorporated by reference into the present application.

TECHNICAL FIELD

The present invention relates to an image display device and a method for controlling the same that enable use of the image display device to be implemented in consideration of convenience of a user.

BACKGROUND ART

An image display device includes, for example, a function for receiving and processing a broadcast image viewable by a user. The image display device displays a broadcast, which is selected by the user from among broadcast signals transmitted from a broadcast station, on a display. Currently broadcasters are transitioning from analog to digital broadcasting.

Digital broadcasting refers to broadcasting of digital video and audio signals. The digital broadcast has low data loss due to robustness against external noise, error correction, high resolution and a high-definition screen, as compared with an analog broadcast. In addition, digital broadcasting can provide a bidirectional service unlike analog broadcasting.

In order to use digital broadcasting including a variety of content, the performance of an image display device has been improved and the function thereof has been diversified. As the performance of the image display device has been improved, various functions of the image display device, such as gaming, music listening or Internet shopping, using various applications can be performed in addition to a function for receiving an image signal from a broadcast station and viewing a broadcast.

In recent years, development of an image display device capable of performing various functions in association with a mobile terminal such as a smart phone or the like and a method for controlling the same has been continuously required.

DISCLOSURE

Technical Problem

The present invention is to provide an image display device capable of performing various functions in association with a mobile terminal such as a smart phone or the like and a method for controlling the same.

Technical Solutions

According to one aspect of the present invention to achieve the above object, provided is an image display device including a display unit, an audio output unit, a wireless communication module for a communication between a mobile terminal and a remote controller, a controller that performs control to establish a first communication connection with the mobile terminal in response to a first communication connection request received through the wireless communication module from the mobile terminal playing first content, receive the first content from the mobile terminal through a first communication and output the first content through the audio output unit, and display a user interface for controlling playback of the first content of the mobile terminal on the display unit.

In addition, according to another aspect of the present invention, provided is a method for controlling an image display device including establishing a first communication connection with a mobile terminal in response to a first communication connection request received from the mobile terminal playing first content, receiving the first content from the mobile terminal through a first communication and outputting the first content through an audio output unit, and displaying a user interface for controlling playback of the first content of the mobile terminal.

Advantageous Effects

Effects of the image display device and the method for controlling the same according to the present invention will be described as follows.

According to at least one of the embodiments of the present invention, the image display device according to the present invention may perform various functions in association with the mobile terminal such as the smartphone or the like.

Specifically, the content being played on the mobile terminal may be conveniently output on the image display device, and the content playback of the mobile terminal may be conveniently controlled through the image display device.

An additional range of applicability of the present invention will become apparent from a detailed description below. However, various changes and modifications within the spirit and scope of the present invention may be clearly understood by those skilled in the art, so that it is to be understood that the detailed description and specific embodiments, such as the preferred embodiments of the present invention, are given by way of example only.

BEST MODE

Figure 1:
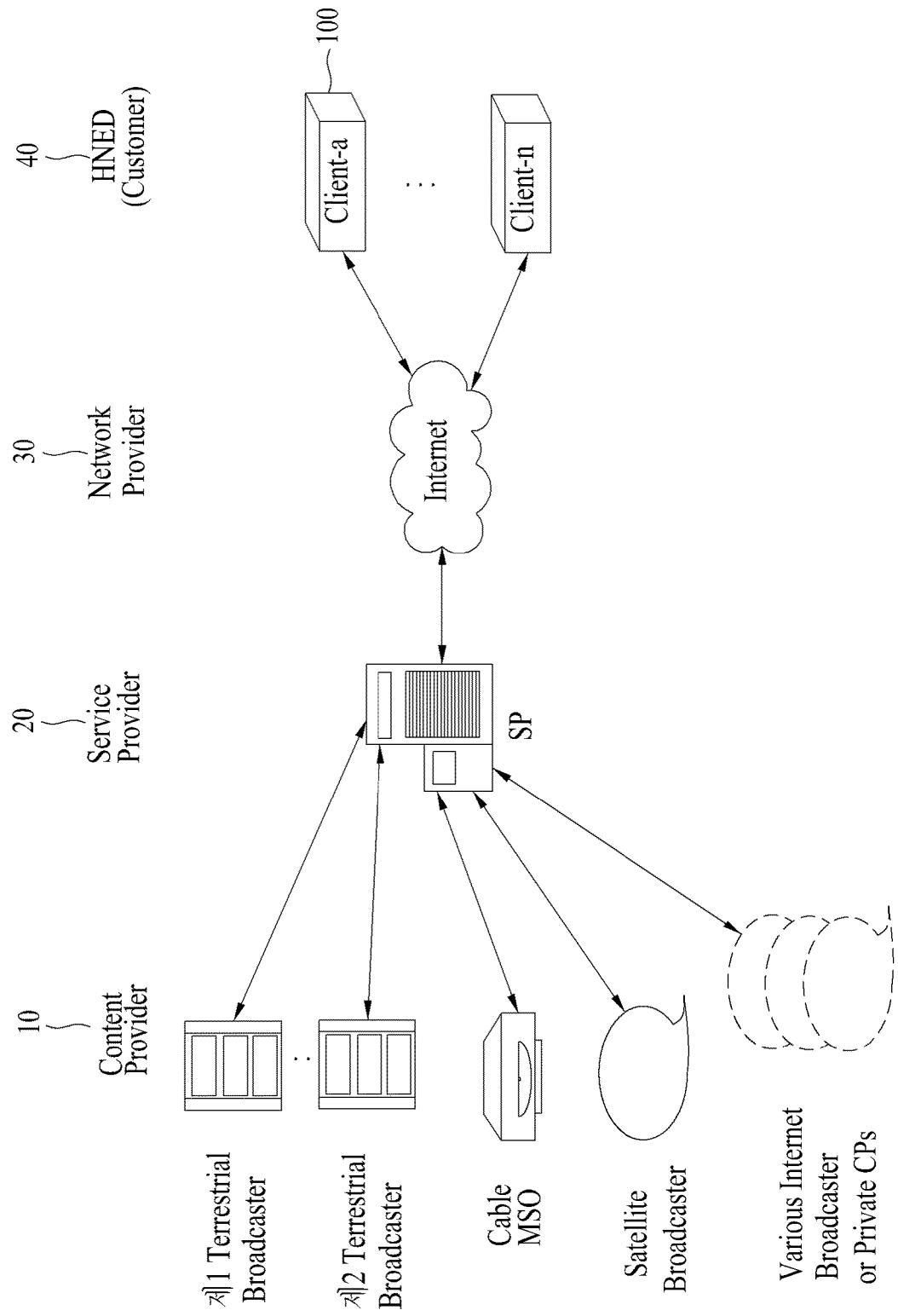
FIG. 1 is a schematic diagram showing an example of a broadcast system including an image display device according to an embodiment of the present invention.

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Hereinafter, the present invention will be described in more detail with reference to the drawings.

The terms "module" and "unit" attached to describe the names of components are used herein to help the understanding of the components and thus should not be considered as having specific meanings or roles. Accordingly, the terms "module" and "unit" may be used interchangeably.

An image display device as set forth herein is an intelligent image display device equipped with a computer support function in addition to a broadcast reception function, for example. Since an Internet function is added to a broadcast reception function, the image display device may have user-friendly interfaces such as a handwriting input device, a touchscreen, or a pointing device. Further, because the image display device supports wired or wireless Internet, it is capable of e-mail transmission/reception, Web browsing, banking, gaming, etc. by connecting to the Internet or a computer. To implement these functions, the image display device may operate based on a standard, general-purpose Operating System (OS).

Various applications can be freely added to or deleted from, for example, a general-purpose OS kernel of the image display device according to the present invention. Therefore, the image display device may perform a number of user-friendly functions. The image display device may be a network TV, a Hybrid broadcast broadband TV (HBBTV), a smart TV, etc. for example. The image display device is also applicable to smart phones.

Embodiments of the present invention will be described in detail with reference to the attached drawings, but it should be understood that they are merely illustrative of the present invention and should not be interpreted as limiting the scope of the present invention.

In addition, although the terms used in the present invention are selected from generally known and used terms, some of the terms mentioned in the description of the present invention, the detailed meanings of which are described in relevant parts of the description herein, have been selected at the discretion of the applicant. Furthermore, the present invention must be understood, not simply by the actual terms used but by the meanings of each term lying within.

FIG. 1 illustrates the overall configuration of a broadcast system including an image display device according to an embodiment of the present invention.

As shown in FIG. 1, the broadcast system including the image display device according to the embodiment of the present invention may include a Content Provider (CP) 10, a Service Provider (SP) 20, a Network Provider (NP) 30, and a Home Network End Device (HNED) 40. The HNED 40 corresponds to, for example, a client 100 which is an image display device according to an embodiment of the present invention. The client 100 corresponds to the image display device according to the embodiment of the present invention, and the image display device may be a network TV, a smart TV, an Internet Protocol TV (IPTV), etc.

The CP 10 creates and provides a variety of content. The CP 10 may be, for example, a terrestrial broadcaster, a cable System Operator (SO) or Multiple System Operator (MSO), a satellite broadcaster, or an Internet broadcaster, as illustrated in FIG. 1.

Besides broadcast content, the CP 10 may provide various applications, which will be described later in detail.

The SP 20 may provide content received from the CP 10 as a service package. For instance, the SP 20 may package first terrestrial broadcasts, second terrestrial broadcasts, cable MSOs, satellite broadcasts, various Internet broadcasts, and applications and provide the package to users.

The SP 20 may unicast or multicast a service to the client 100. Unicast is a form of transmission in which data is sent from only one transmitter to only one receiver. In an example of unicast transmission, upon receipt of a request for data from a receiver, a server transmits the data to only one receiver. Multicast is a type of transmission or communication in which a transmitter transmits data to a group of receivers. For example, a server may transmit data to a plurality of pre-registered receivers at one time. For multicast registration, the Internet Group Management Protocol (IGMP) may be used.

The NP 30 may provide a network over which a service is provided to the client 100. The client 100 may construct a home network end user (HNED) and receive a service over the HNED.

Content transmitted in the above-described system including the image display device may be protected through conditional access or content protection. CableCard and Downloadable Conditional Access System (DCAS) are examples of such conditional access or content protection systems.

The client 100 may also transmit content over a network. In this case, the client 100 serves as a CP and thus the CP 10 may receive content from the client 100. Therefore, an interactive content service or data service can be provided.

Figure 2:
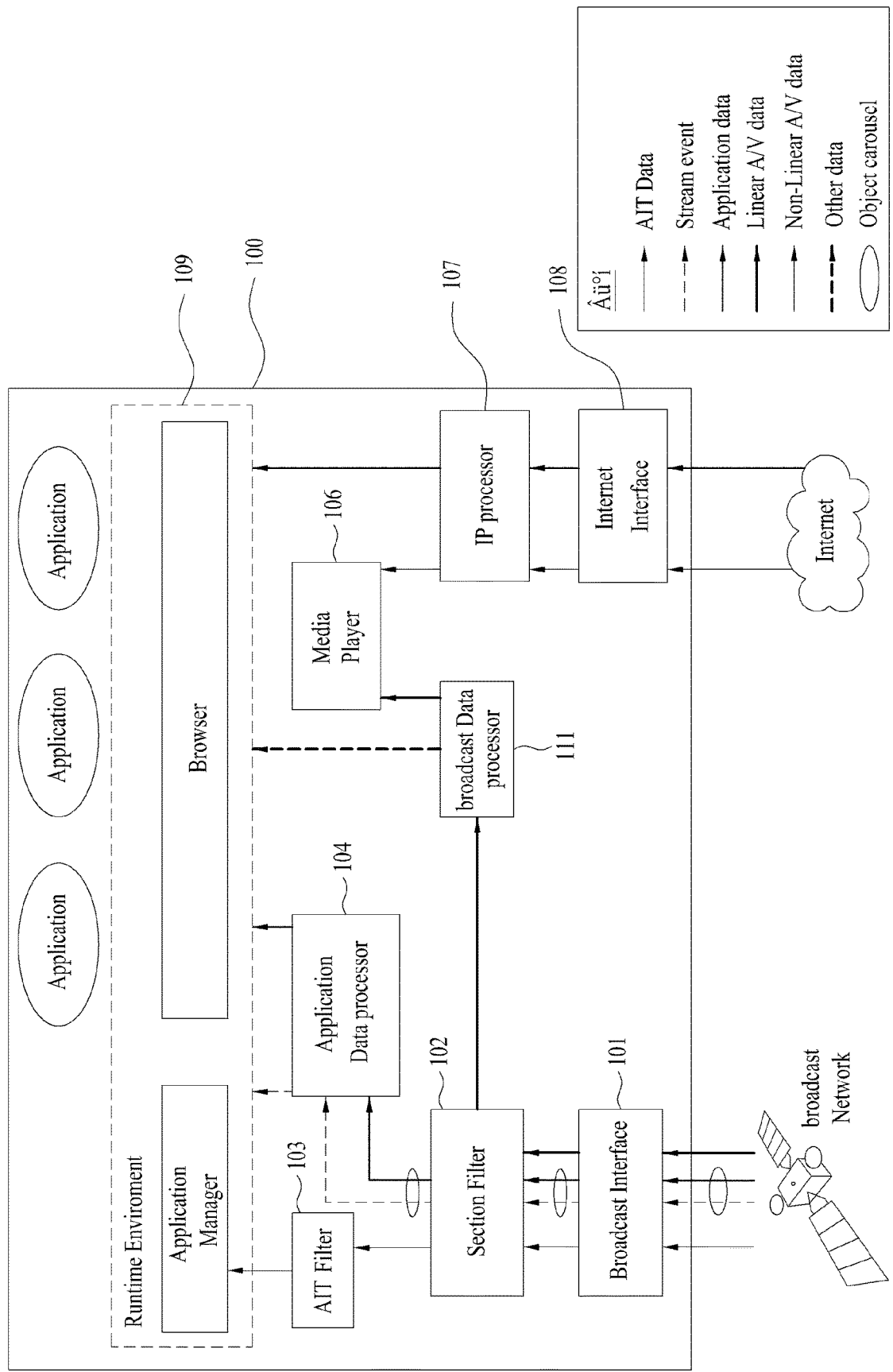
FIG. 2 is a schematic diagram showing another example of a broadcast system including an image display device according to another embodiment of the present invention.

FIG. 2 illustrates the overall configuration of a broadcast system including an image display device according to another embodiment of the present invention.

As shown in FIG. 2, the image display device 100 according to another embodiment of the present invention is connected to a broadcast network and the Internet. The image display device 100 is, for example, a network TV, a smart TV, an HBBTV, etc.

The image display device 100 includes, for example, a broadcast interface 101, a section filter 102, an Application Information Table (AIT) filter 103, an application data processor 104, a broadcast data processor 111, a media player 106, an Internet Protocol (IP) processor 107, an Internet interface 108, and a runtime module 109.

The image display device 100 receives AIT data, real-time broadcast content, application data, and stream events through the broadcast interface 101. The real-time broadcast content may be referred to as linear Audio/Video (A/V) content.

The section filter 102 performs section filtering on the four types of data received through the broadcast interface 101, and outputs the AIT data to the AIT filter 103, the linear A/V content to the broadcast data processor 111, and the stream events and application data to the application data processor 104.

Meanwhile, the image display device 100 receives non-linear A/V content and application data through the Internet interface 108. The non-linear A/V content may be, for example, a Content On Demand (CoD) application.

The non-linear A/V content and the application data are transmitted to the media player 106 and the runtime module 109, respectively.

The runtime module 109 includes, for example, an application manager and a browser as illustrated in FIG. 2. The application manager controls the life cycle of an interactive application using the AIT data, for example. The browser displays and processes the interactive application.

Figure 3:
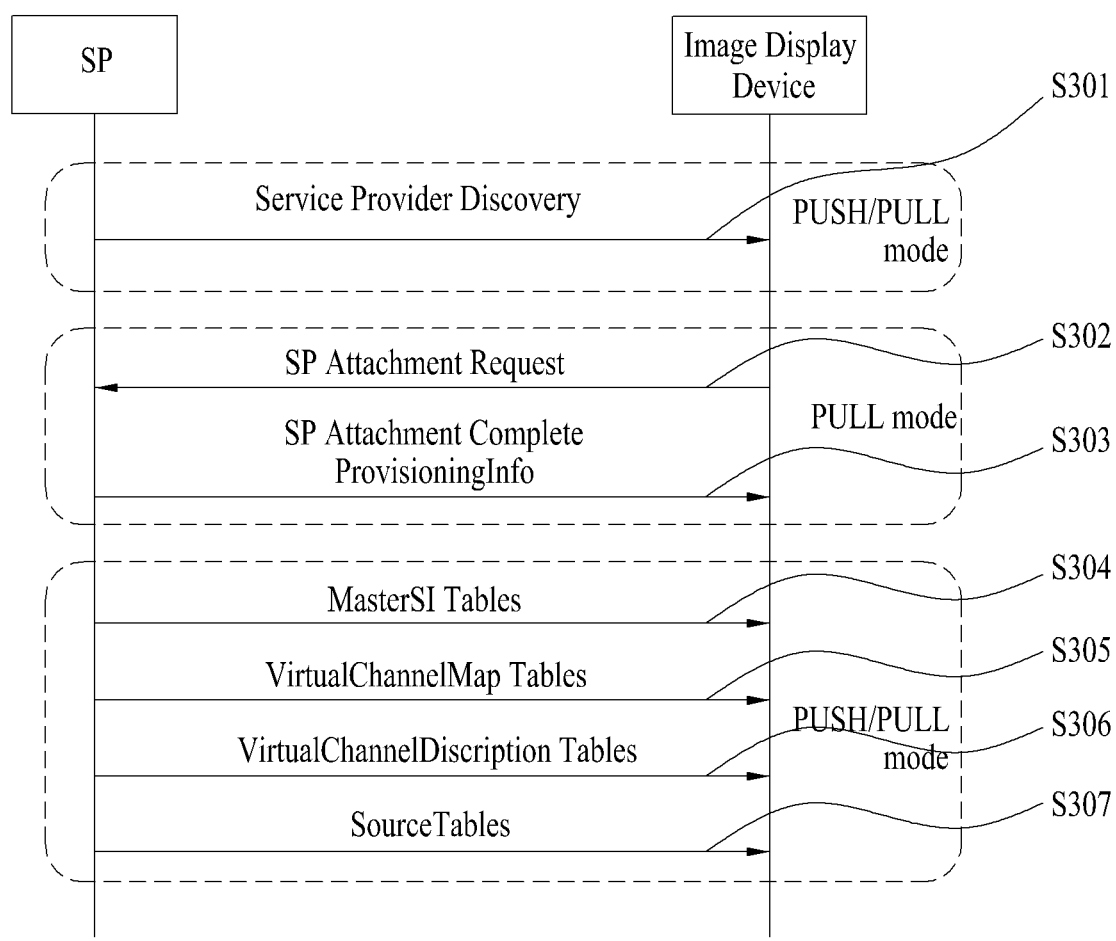
FIG. 3 is a diagram showing steps in which the image display device shown in FIG. 1 or 2 accesses a service provider and receives channel information, etc.

FIG. 3 is a diagram showing steps in which the image display device shown in FIG. 1 or 2 accesses an SP and receives channel information, etc. FIG. 3 is purely exemplary and the method shown in FIG. 3 does not limit the scope of the present invention.

The SP performs an SP discovery operation (S301). The image display device transmits an SP attachment request signal (S302). Upon completion of attachment to the SP, the image display device receives provisioning information from the SP (S303). Further, the image display device receives Master System Information (SI) Tables (S304), receives Virtual Channel Map Tables (S305), receives Virtual Channel Description Tables (S306), and receives Source Tables from the SP (S307).

A more detailed description is as follows.

More specifically, SP Discovery is a process by which SPs that provide IPTV services search for servers providing services to the SPs.

In order to receive information (e.g., SP discovery information) about the service discovery (SD) servers, an SD server address list can be detected, for example, using three methods, specifically use of an address preset in the image display device or an address manually set by a user, Dynamic Host Configuration Protocol (DHCP)-based SP Discovery, and Domain Name System Service (DNS SRV)-based SP Discovery. The image display device accesses a specific SD server using the SD server address list obtained through one of the above three methods and receives an SP Discovery record from the specific SD server. The Service Provider Discovery record includes information needed to perform Service Discovery on an SP basis. The image display device then starts a Service Discovery operation using the SP Discovery record. These operations can be performed in a push mode or a pull mode.

The image display device accesses an SP attachment server specified by an SP attachment locator included in the SP Discovery record and performs a registration procedure (or a service attachment procedure).

Further, after accessing an authentication service server of an SP specified by an SP authentication locator and performing an authentication procedure, the image display device may perform a service authentication procedure.

Once service attachment is successfully completed, a server may transmit data to the image display device in the form of a provision information table.

During service attachment, the image display device may include an Identifier (ID) and location information thereof in data and transmit the data to the service attachment server. Thus the service attachment server may specify a service that the image display device has subscribed to based on the ID and location information. In addition, the service attachment server provides, in the form of a provisioning information table, address information from which the image display device can obtain Service Information (SI). The address information corresponds to access information about a Master SI Table. This method facilitates provision of a customized service to each subscriber.

The SI is divided into a Master SI Table record for managing access information and version information about a Virtual Channel Map, a Virtual Channel Map Table for providing a list of services in the form of a package, a Virtual Channel Description Table that contains details of each channel, and a Source Table that contains access information about actual services.

Figure 4:
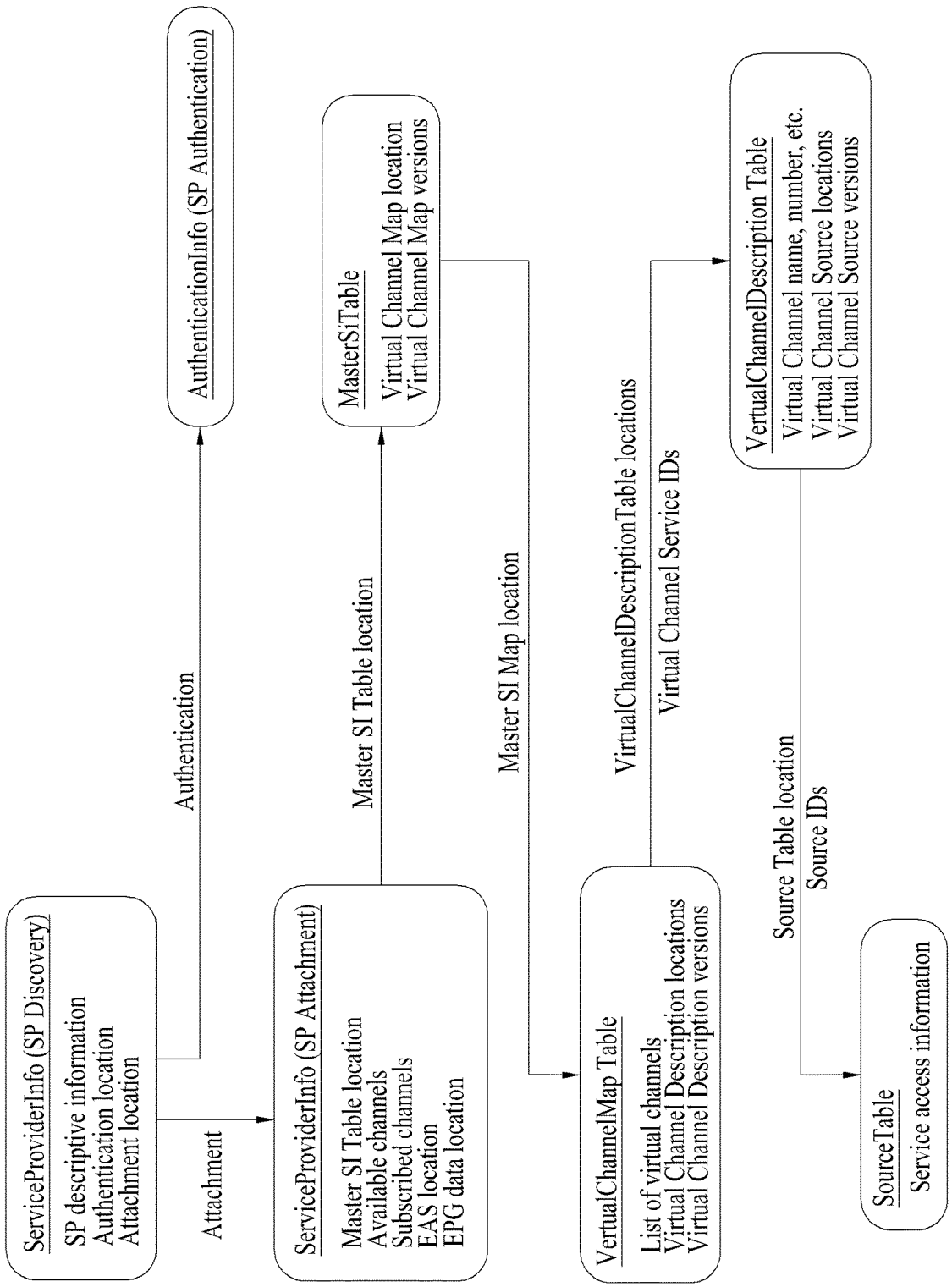
FIG. 4 is a diagram showing an example of data used in the steps shown in FIG. 3.

FIG. 4 is a diagram showing an example of data used in the steps shown in FIG. 3.

FIG. 4 is a detailed diagram of FIG. 3, illustrating a relationship among data in the SI.

A Master SI Table contains information about the location and version of each Virtual Channel MAP.

Each Virtual Channel MAP is identified by its Virtual Channel MAP identifier. Virtual Channel MAP Version specifies the version number of the Virtual Channel MAP. If any of the tables connected to the Master SI Table shown in FIG. 4 in the arrowed direction is modified, the versions of the modified table and overlying tables thereof (up to the Master SI Table) are incremented. Accordingly, a change in any of the SI tables can be readily identified by monitoring the Master SI Table.

For example, when the Source Table is changed, the version of the Source Table is incremented and the version of the Virtual Channel Description Table that references the Source Table is also incremented. In conclusion, a change in any lower table leads to a change in its higher tables and, eventually, a change in the Master SI Table.

One Master SI Table may exist for each SP. However, in the case where service configurations differ for regions or subscribers (or subscriber groups), an SP may have a plurality of Master SI Tables in order to provide a customized service on a unit basis. Thus it is possible to efficiently provide a customized service to a subscriber through the master SI table according to a region in which the subscriber is located and subscriber information regarding the subscriber.

A Virtual Channel Map Table may contain one or more virtual channels. A Virtual Channel Map includes not only details of the channels but information about the locations of the details of the channels. In the Virtual Channel Map Table, Virtual Channel Description Location specifies the location of a Virtual Channel Description Table including the details of the channels.

The Virtual Channel Description Table contains the details of the virtual channels. The Virtual Channel Description Table can be accessed using the Virtual Channel Description Location of the Virtual Channel Map Table.

A Source Table provides information necessary to access actual services (e.g. IP addresses, ports, AV Codecs, transmission protocols, etc.) on a service basis.

The above-described Master SI Table, the Virtual Channel Map Table, the Virtual Channel Description Table and the Source Table are delivered in four logically separate flows, in a push mode or a pull mode. For version management, the Master SI Table may be multicast and thus version changes can be monitored by receiving a multicast stream.

Figure 5:
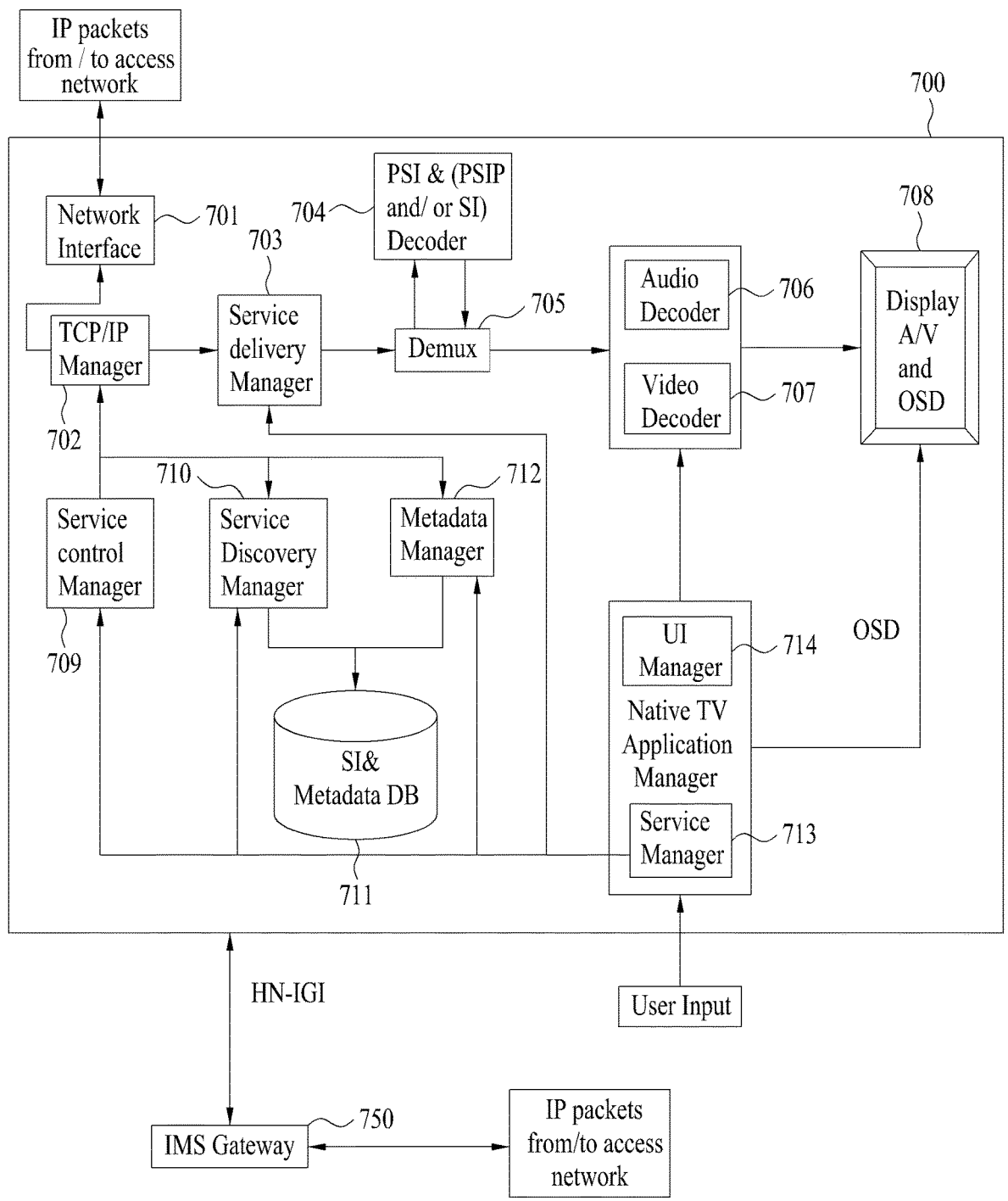
FIG. 5 is a diagram showing an example of the image display device shown in FIG. 1 or 2 in greater detail.

FIG. 5 is a detailed block diagram of the image display device shown in FIG. 1 or 2 according to an embodiment of the present invention. The structure of the image display device in FIG. 5 is purely exemplary and should not be interpreted as limiting the scope of the present invention.

An image display device 700 includes a network interface 701, a Transmission Control Protocol/Internet Protocol (TCP/IP) manager 702, a service delivery manager 703, a demultiplexer (DEMUX) 705, a Program Specific Information (PSI) & (Program and System Information Protocol (PSIP) and/or SI) decoder 704, an audio decoder 706, a video decoder 707, a display A/V and OSD module 708, a service control manager 709, a service discovery manager 710, a metadata manager 712, an SI & metadata database (DB) 711, a User Interface (UI) manager 714, and a service manager 713.

The network interface 701 transmits packets to and receives packets from a network. Specifically, the network interface 701 receives services and content from an SP over the network.

The TCP/IP manager 702 is involved in packet reception and transmission of the image display device 700, that is, packet delivery from a source to a destination. The TCP/IP manager 702 classifies received packets according to appropriate protocols and outputs the classified packets to the service delivery manager 705, the service discovery manager 710, the service control manager 709, and the metadata manager 712.

The service delivery manager 703 controls reception of service data. For example, when controlling real-time streaming data, the service delivery manager 703 may use the Real-time Transport Protocol/Real-time Transport Control Protocol (RTP/RTCP). If real-time streaming data is transmitted over RTP, the service delivery manager 703 parses the received real-time streaming data using RTP and transmits the parsed real-time streaming data to the DEMUX 705 or stores the parsed real-time streaming data in the SI & metadata DB 711 under the control of the service manager 713. In addition, the service delivery manager 703 feeds back network reception information to a server that provides the service using RTCP.

The DEMUX 705 demultiplexes a received packet into audio data, video data and PSI data and transmits the audio data, video data and PSI data to the audio decoder 706, the video decoder 707, and the PSI & (PSIP and/or SI) decoder 704, respectively.

The PSI & (PSIP and/or SI) decoder 704 decodes SI such as PSI. More specifically, the PSI & (PSIP and/or SI) decoder 704 receives and decodes PSI sections, PSIP sections or SI sections demultiplexed by the DEMUX 705.

The PSI & (PSIP and/or SI) decoder 704 constructs an SI DB by decoding the received sections and stores the SI DB in the SI & metadata DB 711.

The audio decoder 706 and the video decoder 707 decode the audio data and the video data received from the DEMUX 705 and output the decoded audio and video data to a user through the display A/V and OSD module 708.

The UI manager 714 and the service manager 713 manage the overall state of the image display device 700, provide UIs, and manage other managers.

The UI manager 714 provides a Graphical User Interface (GUI) in the form of an OSD and performs a reception operation corresponding to a key input received from the user. For example, upon reception of a key input signal regarding channel selection from the user, the UI manager 714 transmits the key input signal to the service manager 713.

The service manager 713 controls managers associated with services, such as the service delivery manager 703, the service discovery manager 710, the service control manager 709, and the metadata manager 712.

The service manager 713 also creates a channel map and selects a channel using the channel map according to the key input signal received from the UI manager 714. The service manager 713 sets the audio/video Packet ID (PID) of the selected channel based on SI of the channel received from the PSI & (PSIP and/or SI) decoder 704 in the demultiplexer 705.

The service discovery manager 710 provides information necessary to select an SP that provides a service. Upon receipt of a channel selection signal from the service manager 713, the service discovery manager 710 detects a service based on the channel selection signal.

The service control manager 709 takes charge of selection and control services. For example, if a user selects a live broadcasting service, such as a conventional broadcasting service, the service control manager selects and controls the service using Internet Group Management Protocol (IGMP) or Real-Time Streaming Protocol (RTSP). If the user selects Video on Demand (VoD), the service control manager 709 selects and controls the service using RTSP. RTSP supports trick mode for real-time streaming. Further, the service control manager 709 may initialize and manage a session through an IP Multimedia Control (IMC) gateway using IP Multimedia Subsystem (IMS) and Session Initiation Protocol (SIP). The protocols are only exemplary and thus other protocols are also applicable.

The metadata manager 712 manages metadata related to services and stores the metadata in the SI & metadata DB 711.

The SI & metadata DB 711 stores the SI decoded by the PSI & (PSIP and/or SI) decoder 704, the metadata managed by the metadata manager 712, and the information required to select an SP, received from the service discovery manager 710. The SI & metadata DB 711 may store system setup data.

The SI & metadata DB 711 may be constructed in a Non-Volatile RAM (NVRAM) or a flash memory.

An IMS Gateway (IG) 750 is a gateway equipped with functions needed to access IMS-based IPTV services.

Figure 6:
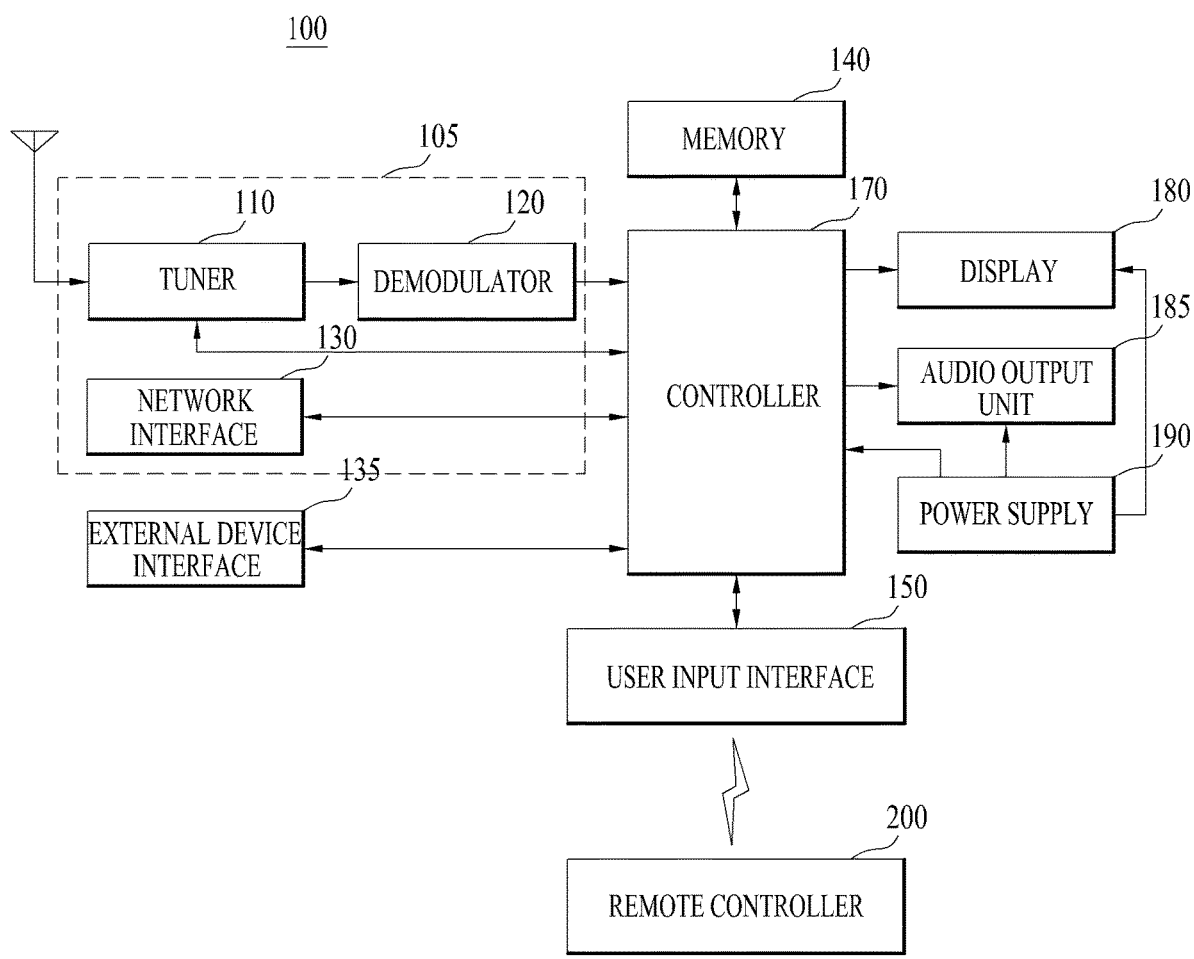
FIG. 6 is a diagram showing another example of the image display device shown in FIG. 1 or 2 in greater detail.

FIG. 6 is a detailed block diagram of the image display device shown in FIG. 1 or 2 according to another embodiment of the present invention.

Referring to FIG. 6, an image display device 100 according to another embodiment of the present invention includes a broadcast receiver 105, an external device interface 135, a memory 140, a user input interface 150, a controller 170, a display 180, an audio output unit 185, a power supply 190, and a camera module (not shown). The broadcasting receiver 105 may include a tuner 110, a demodulator 120 and a network interface 130. As needed, the broadcasting receiver 105 may be configured so as to include only the tuner 110 and the demodulator 120 or only the network interface 130.

The tuner 110 tunes to a Radio Frequency (RF) broadcast signal corresponding to a channel selected by a user from among a plurality of RF broadcast signals received through an antenna and downconverts the tuned RF broadcast signal into a digital Intermediate Frequency (IF) signal or an analog baseband video or audio signal.

More specifically, if the tuned RF broadcast signal is a digital broadcast signal, the tuner 110 downconverts the tuned RF broadcast signal into a digital IF signal DIF. On the other hand, if the tuned RF broadcast signal is an analog broadcast signal, the tuner 110 downconverts the tuned RF broadcast signal into an analog baseband video or audio signal CVBS/SIF. That is, the tuner 110 may be a hybrid tuner capable of processing not only digital broadcast signals but also analog broadcast signals. The analog baseband video or audio signal CVBS/SIF may be directly input to the controller 170.

The tuner 110 may be capable of receiving RF broadcast signals from an Advanced Television Systems Committee (ATSC) single-carrier system or from a Digital Video Broadcasting (DVB) multi-carrier system.

The tuner 110 may sequentially tune to a number of RF broadcast signals corresponding to all broadcast channels previously stored by a channel storage function from a plurality of RF signals received through the antenna and may downconvert the tuned RF broadcast signals into IF signals or baseband video or audio signals.

The demodulator 120 receives the digital IF signal DIF from the tuner 110 and demodulates the digital IF signal DIF.

For example, if the digital IF signal DIF is an ATSC signal, the demodulator 120 may perform 8-Vestigal Side-Band (VSB) demodulation on the digital IF signal DIF. The demodulator 120 may also perform channel decoding. For channel decoding, the demodulator 120 may include a Trellis decoder (not shown), a de-interleaver (not shown) and a Reed-Solomon decoder (not shown) so as to perform Trellis decoding, de-interleaving and Reed-Solomon decoding.

For example, if the digital IF signal DIF is a DVB signal, the demodulator 120 performs Coded Orthogonal Frequency Division Multiple Access (COFDMA) demodulation upon the digital IF signal DIF. The demodulator 120 may also perform channel decoding. For channel decoding, the demodulator 120 may include a convolution decoder (not shown), a de-interleaver (not shown), and a Reed-Solomon decoder (not shown) so as to perform convolution decoding, de-interleaving, and Reed-Solomon decoding.

The demodulator 120 may perform demodulation and channel decoding on the digital IF signal DIF, thereby obtaining a Transport Stream (TS). The TS may be a signal in which a video signal, an audio signal and a data signal are multiplexed. For example, the TS may be an MPEG-2 TS in which an MPEG-2 video signal and a Dolby AC-3 audio signal are multiplexed. An MPEG-2 TS may include a 4-byte header and a 184-byte payload.

In order to properly handle not only ATSC signals but also DVB signals, the demodulator 120 may include an ATSC demodulator and a DVB demodulator.

The TS output from the demodulator 120 may be input to the controller 170 and thus subjected to demultiplexing and A/V signal processing. The processed video and audio signals are output to the display 180 and the audio output unit 185, respectively.

The external device interface 135 may serve as an interface between an external device and the image display device 100. For interfacing, the external device interface 135 may include an A/V Input/Output (I/O) unit (not shown) and/or a wireless communication module (not shown).

The external device interface 135 may be connected to an external device such as a Digital Versatile Disc (DVD) player, a Blu-ray player, a game console, a camera, a camcorder, or a computer (e.g., a laptop computer), wirelessly or by wire. Then, the external device interface 135 externally receives video, audio, and/or data signals from the external device and transmits the received input signals to the controller 170. In addition, the external device interface 135 may output video, audio, and data signals processed by the controller 170 to the external device. In order to receive or transmit audio, video and data signals from or to the external device, the external device interface 135 includes the A/V I/O unit (not shown) and/or the wireless communication module (not shown).

The A/V I/O unit may include a Universal Serial Bus (USB) port, a Composite Video Banking Sync (CVBS) port, a Component port, a Super-video (S-video) (analog) port, a Digital Visual Interface (DVI) port, a High-Definition Multimedia Interface (HDMI) port, a Red-Green-Blue (RGB) port, and a D-sub port, in order to input the video and audio signals of the external device to the image display device 100.

The wireless communication module may perform short-range wireless communication with other electronic devices. For short-range wireless communication, the wireless communication module may use Bluetooth, Radio-Frequency IDentification (RFID), Infrared Data Association (IrDA), Ultra WideBand (UWB), ZigBee, and Digital Living Network Alliance (DLNA) communication standards.

The external device interface 135 may be connected to various set-top boxes through at least one of the above-described ports and may thus perform an I/O operation with the various set-top boxes.

The external device interface 135 may receive applications or an application list from an adjacent external device and provide the applications or the application list to the controller 170 or the memory 140.

The network interface 130 serves as an interface between the image display device 100 and a wired/wireless network such as the Internet. The network interface 130 may include an Ethernet port for connection to a wired network. For connection to wireless networks, the network interface 130 may use Wireless Local Area Network (WLAN) (i.e., Wi-Fi), Wireless Broadband (WiBro), World Interoperability for Microwave Access (WiMax), and High Speed Downlink Packet Access (HSDPA).

The network interface 130 may transmit data to or receive data from another user or electronic device over a connected network or another network linked to the connected network. Especially, the network interface 130 may transmit data stored in the image display device 100 to a user or electronic device selected from among users or electronic devices pre-registered with the image display device 100.

The network interface 130 may access a specific Web page over a connected network or another network linked to the connected network. That is, the network interface 130 may access a specific Web page over a network and transmit or receive data to or from a server. Additionally, the network interface 130 may receive content or data from a CP or an NP. Specifically, the network interface 130 may receive content such as movies, advertisements, games, VoD, and broadcast signals, and information related to the content from a CP or an NP. Also, the network interface 130 may receive update information about firmware from the NP and update the firmware. The network interface 130 may transmit data over the Internet or to the CP or the NP.

The network interface 130 may selectively receive a desired application among open applications over a network.

In an embodiment of the present invention, when a game application is executed in the image display device, the network interface 130 may transmit data to or receive data from a user terminal connected to the image display device through a network. In addition, the network interface 130 may transmit specific data to or receive specific data from a server that records game scores.

The memory 140 may store various programs necessary for the controller 170 to process and control signals, and may also store processed video, audio and data signals.

The memory 140 may temporarily store a video, audio and/or data signal received from the external device interface 135 or the network interface 130. The memory 140 may store information about broadcast channels by the channel storage function.

The memory 140 may store applications or a list of applications received from the external device interface 135 or the network interface 130.

The memory 140 may store a variety of platforms which will be described later.

In an embodiment of the present invention, when the image display device provides a game application, the memory 140 may store user-specific information and game play information of a user terminal used as a game controller.

The memory 140 may include, for example, at least one of a flash memory-type storage medium, a hard disk-type storage medium, a multimedia card micro-type storage medium, a card-type memory (e.g. a Secure Digital (SD) or eXtreme Digital (XD) memory), a Random Access Memory (RAM), or a Read-Only Memory (ROM) such as an Electrically Erasable and Programmable Read Only Memory (EEPROM). The image display device 100 may reproduce content stored in the memory 140 (e.g. video files, still image files, music files, text files, and application files) to the user.

While the memory 140 is shown in FIG. 6 as configured separately from the controller 170, to which the present invention is not limited, the memory 140 may be incorporated into the controller 170, for example.

The user input interface 150 transmits a signal received from the user to the controller 170 or transmits a signal received from the controller 170 to the user.

For example, the user input interface 150 may receive control signals such as a power-on/off signal, a channel selection signal, and a screen setting signal from a remote controller 200 or may transmit a control signal received from the controller 170 to the remote controller 200, according to various communication schemes, for example, RF communication and IR communication.

For example, the user input interface 150 may provide the controller 170 with control signals received from local keys (not shown), such as inputs of a power key, a channel key, and a volume key, and setting values.

Also, the user input interface 150 may transmit a control signal received from a sensor unit (not shown) for sensing a user gesture to the controller 170 or transmit a signal received from the controller 170 to the sensor unit. The sensor unit may include a touch sensor, a voice sensor, a position sensor, a motion sensor, etc.

The controller 170 may demultiplex the TS received from the tuner 110, the demodulator 120, or the external device interface 135 into a number of signals and process the demultiplexed signals into audio and video data.

The video signal processed by the controller 170 may be displayed as an image on the display 180. The video signal processed by the controller 170 may also be transmitted to an external output device through the external device interface 135.

The audio signal processed by the controller 170 may be audibly output through the audio output unit 185. Also, the audio signal processed by the controller 170 may be transmitted to the external output device through the external device interface 135.

While not shown in FIG. 6, the controller 170 may include a DEMUX and a video processor, which will be described later with reference to FIG. 10.

In addition, the controller 170 may provide overall control to the image display device 100. For example, the controller 170 may control the tuner 110 to tune to an RF broadcast signal corresponding to a user-selected channel or a pre-stored channel.

The controller 170 may control the image display device 100 according to a user command received through the user input interface 150 or according to an internal program. Especially the controller 170 may access a network and download an application or application list selected by the user to the image display device 100 over the network.

For example, the controller 170 controls the tuner 110 to receive a signal of a channel selected according to a specific channel selection command received through the user input interface 150 and processes a video, audio and/or data signal of the selected channel. The controller 170 outputs the processed video or audio signal along with information about the user-selected channel to the display 180 or the audio output unit 185.

As another example, the controller 170 outputs a video or audio signal received from an external device such as a camera or a camcorder through the external device interface 135 to the display 180 or the audio output unit 185 according to an external device video playback command received through the external device interface 150.

The controller 170 may control the display 180 to display images. For instance, the controller 170 may control the display 180 to display a broadcast image received from the tuner 110, an externally input image received through the external device interface 135, an image received through the network interface 130, or an image stored in the memory 140. The image displayed on the display 180 may be a Two-Dimensional (2D) or Three-Dimensional (3D) still image or moving picture.

The controller 170 may control content playback. The content may include any content stored in the image display device 100, received broadcast content, and externally input content. The content includes at least one of a broadcast image, an externally input image, an audio file, a still image, a Web page, or a text file.

Upon receipt of a return-to-home screen input, the controller 170 may control display of the home screen on the display 180.

The home screen may include a plurality of card objects classified according to content sources. The card objects may include at least one of a card object representing a thumbnail list of broadcast channels, a card object representing a broadcast program guide, a card object representing a program reservation list or a program recording list, or a card object representing a media list of a device connected to the image display device. The card objects may further include at least one of a card object representing a list of connected external devices or a card object representing a call-associated list.

The home screen may further include an application menu including at least one application that can be executed.

Upon receipt of a card object move input, the controller 170 may control movement of a card object corresponding to the card object move input on the display 180, or if the card object is not displayed on the display 180, the controller 170 may control display of the card object on the display 180.

When a card object is selected from among the card objects on the home screen, the controller 170 may control display of an image corresponding to the selected card object on the display 180.

The controller 170 may control display of an input broadcast image and an object representing information about the broadcast image in a card object representing broadcast images. The size of the broadcast image may be set to a fixed size.

The controller 170 may control display of a set-up object for at least one of image setting, audio setting, screen setting, reservation setting, setting of a pointer of the remote controller, or network setting on the home screen.

The controller 170 may control display of a log-in object, a help object, or an exit object on a part of the home screen.

The controller 170 may control display of an object representing the total number of available card objects or the number of card objects displayed on the display 180 among all card objects, on a part of the home screen.

If one of the card objects displayed on the display 180 is selected, the controller 170 may fullscreen the selected card object to cover the entirety of the display 180.

Upon receipt of an incoming call at a connected external device or the image display device 100, the controller 170 may control focusing-on or shift of a call-related card object among the plurality of card objects.

If an application view menu item is selected, the controller 170 may control display of applications or a list of applications that are present in the image display device 100 or downloadable from an external network.

The controller 170 may control installation and execution of an application downloaded from the external network along with various UIs. Also, the controller 170 may control display of an image related to the executed application on the display 180, upon user selection.

Although not shown, the image display device 100 may further include a channel browsing processor for generating thumbnail images corresponding to channel signals or externally input signals.

The channel browsing processor may receive the TS output from the demodulator 120 or the TS output from the external device interface 135, extract images of the received TS and generate thumbnail images. The thumbnail images may be directly output to the controller 170 or may be output after being encoded. Also, it is possible to encode the thumbnail images into a stream and output the stream to the controller 170. The controller 170 may display a thumbnail list including a plurality of received thumbnail images on the display 180. The thumbnail images may be updated sequentially or simultaneously in the thumbnail list. Therefore, the user can readily identify the content of broadcast programs received through a plurality of channels.

The display 180 may convert a processed video signal, a processed data signal, and an OSD signal received from the controller 170 or a video signal and a data signal received from the external device interface 135 into RGB signals, thereby generating driving signals.

The display 180 may be various types of displays such as a Plasma Display Panel (PDP), a Liquid Crystal Display (LCD), an Organic Light-Emitting Diode (OLED) display, a flexible display, and a 3D display.

The display 180 may also be a touchscreen that can be used not only as an output device but also as an input device.

The audio output unit 185 may receive a processed audio signal (e.g., a stereo signal, a 3.1-channel signal or a 5.1-channel signal) from the controller 170 and output the received audio signal as sound. The audio output unit 185 may employ various speaker configurations.

To sense a user gesture, the image display device 100 may further include the sensor unit (not shown) that has at least one of a touch sensor, a voice sensor, a position sensor, and a motion sensor, as stated before. A signal sensed by the sensor unit may be output to the controller 170 through the user input interface 150.

The image display device 100 may further include the camera unit (not shown) for capturing images of a user. Image information captured by the camera unit may be input to the controller 170.

The controller 170 may sense a user gesture from an image captured by the camera unit or a signal sensed by the sensor unit, or by combining the captured image and the sensed signal.

The power supply 190 supplies power to the image display device 100.

Particularly, the power supply 190 may supply power to the controller 170 which may be implemented as a System On Chip (SOC), the display 180 for displaying an image, and the audio output unit 185 for audio output.

For supplying power, the power supply 190 may include a converter (not shown) for converting Alternating Current (AC) into Direct Current (DC). If the display 180 is configured with, for example, a liquid crystal panel having a plurality of backlight lamps, the power supply 190 may further include an inverter (not shown) capable of performing Pulse Width Modulation (PWM) for luminance change or dimming driving.

The remote controller 200 transmits a user input to the user input interface 150. For transmission of user input, the remote controller 200 may use various communication techniques such as Bluetooth, RF communication, IR communication, Ultra Wideband (UWB) and ZigBee.

In addition, the remote controller 200 may receive a video signal, an audio signal or a data signal from the user input interface 150 and output the received signals visually, audibly or as vibrations.

The above-described image display device 100 may be a fixed digital broadcast receiver capable of receiving at least one of ATSC (8-VSB) broadcast programs, DVB-T (COFDM) broadcast programs, and ISDB-T (BST-OFDM) broadcast programs.

The block diagram of the image display device 100 illustrated in FIG. 6 is purely exemplary. Depending upon the specifications of the image display device 100 in actual implementation, the components of the image display device 100 may be combined or omitted or new components may be added. That is, two or more components may be incorporated into one component or one component may be configured as separate components, as needed. In addition, the function of each block is described for the purpose of describing the embodiment of the present invention and thus specific operations or devices should not be construed as limiting the scope and spirit of the present invention.

Unlike the configuration illustrated in FIG. 6, the image display device 100 may be configured so as to receive and play back video content through the network interface 130 or the external device interface 135, without the tuner 110 and the demodulator 120 shown in FIG. 6.

The image display device 100 is an exemplary image signal processing device that processes a stored image or an input image. Other examples of the image signal processing device include a set-top box without the display 180 and the audio output unit 185 shown in FIG. 6, a DVD player, a Blu-ray player, a game console, and a computer. The set-top box will be described later with reference to FIGS. 7 and 8.

Figure 7:
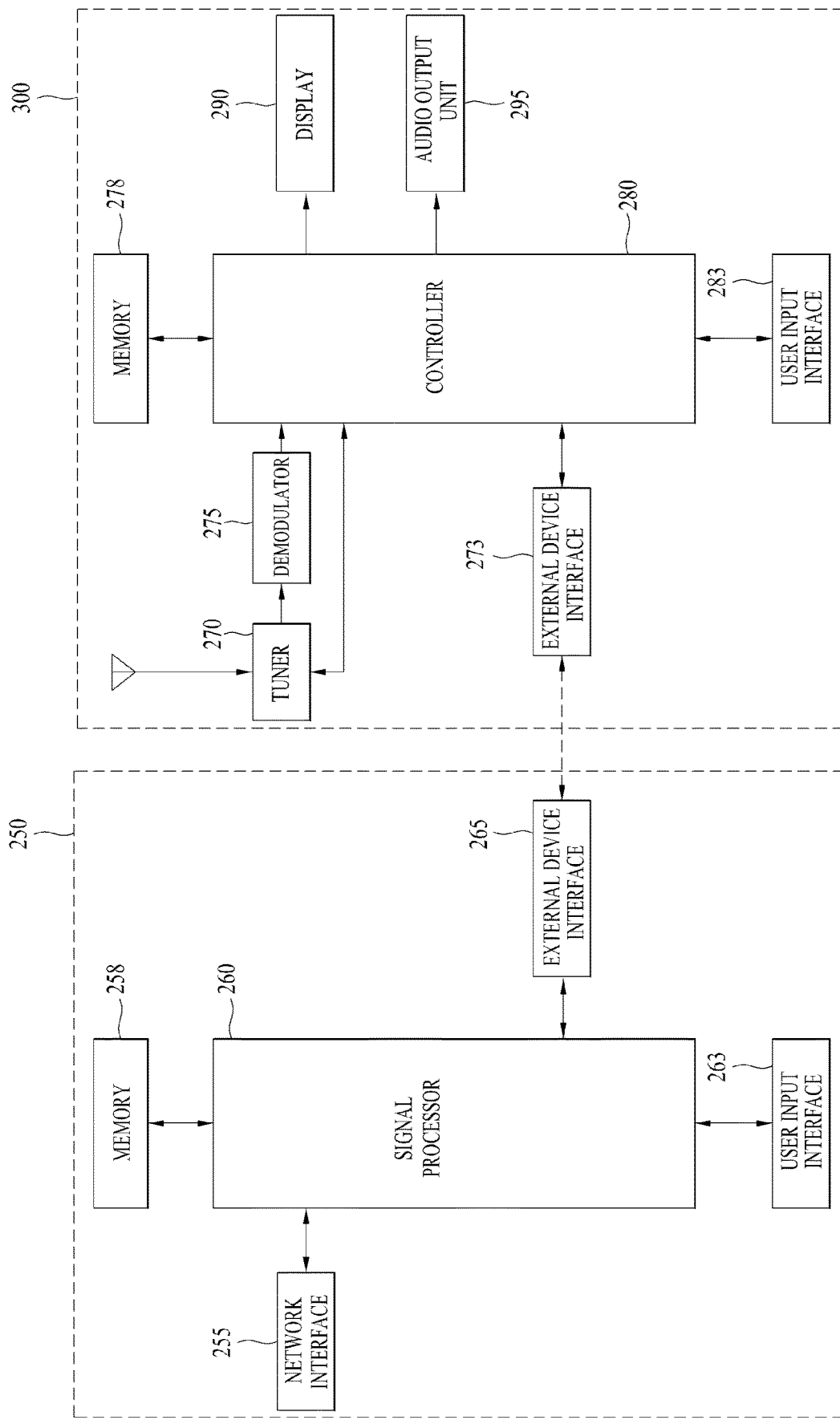
FIGS. 7 and 8 are diagrams showing any one of the image display devices separately as a set-top box and a display device according to embodiments of the present invention.
Figure 8:
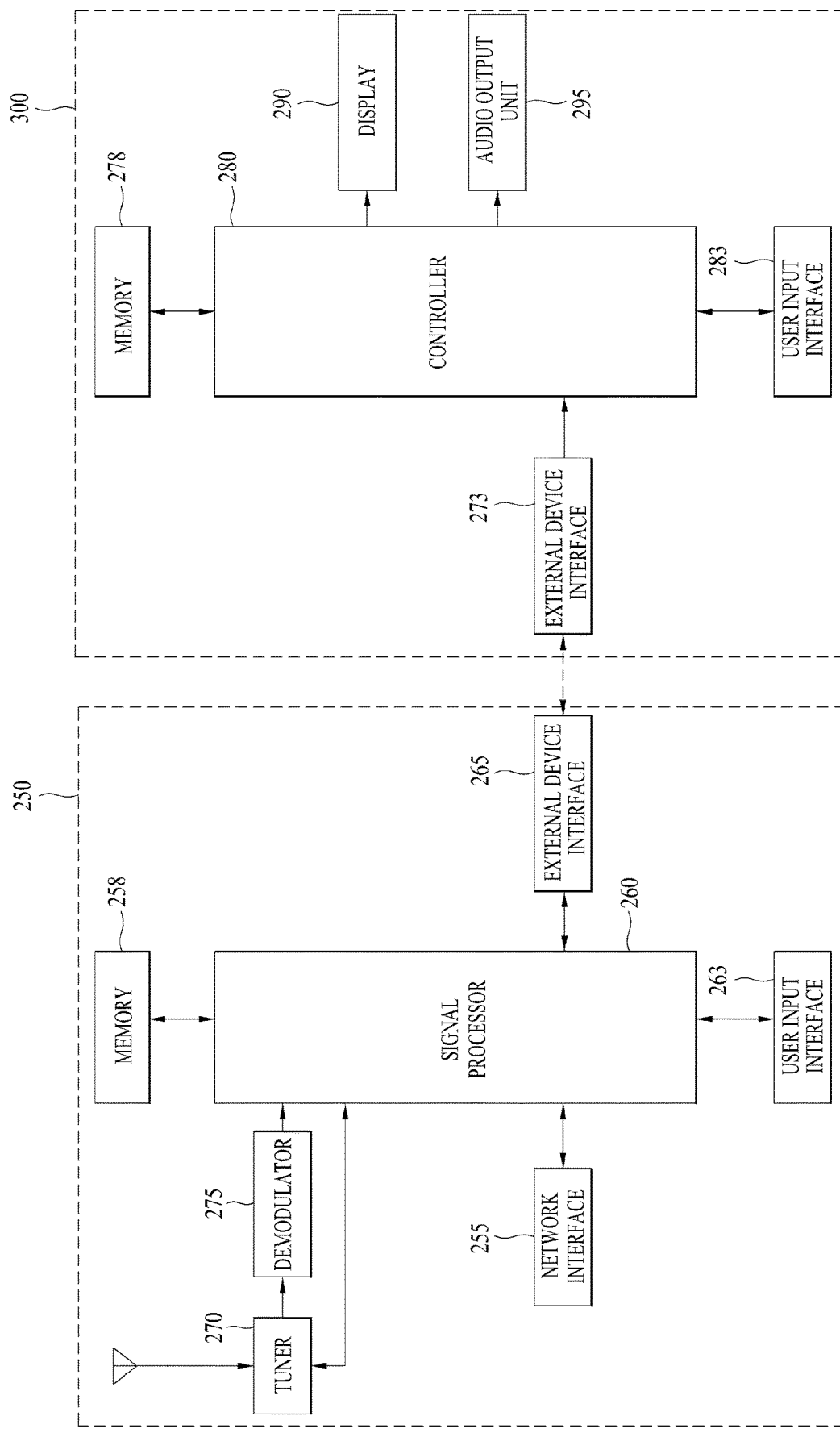

FIGS. 7 and 8 are diagrams illustrating any one of the image display devices separately as a set-top box and a display device according to embodiments of the present invention.

Referring to FIG. 7, a set-top box 250 and a display device 300 may transmit or receive data wirelessly or by wire.

The set-top box 250 may include a network interface 255, a memory 258, a signal processor 260, a user input interface 263, and an external device interface 265.

The network interface 255 serves as an interface between the set-top box 250 and a wired/wireless network such as the Internet. The network interface 255 may transmit data to or receive data from another user or another electronic device over a connected network or over another network linked to the connected network.

The memory 258 may store programs necessary for the signal processor 260 to process and control signals and temporarily store a video, audio and/or data signal received from the external device interface 265 or the network interface 255. The memory 258 may also store platforms shown in FIGS. 11 and 12, as described later.

The signal processor 260 processes an input signal. For example, the signal processor 260 may demultiplex or decode an input video or audio signal. For signal processing, the signal processor 260 may include a video decoder or an audio decoder. The processed video or audio signal may be transmitted to the display device 300 through the external device interface 265.

The user input interface 263 transmits a signal received from the user to the signal processor 260 or a signal received from the signal processor 260 to the user. For example, the user input interface 263 may receive various control signals such as a power on/off signal, an operation input signal, and a setting input signal through a local key (not shown) or the remote controller and output the control signals to the signal processor 260.

The external device interface 265 serves as an interface between the set-top box 250 and an external device that is connected wirelessly or by wire, particularly the display device 300, for data transmission or reception. The external device interface 265 may also interface with an external device such as a game console, a camera, a camcorder, and a computer (e.g. a laptop computer), for data transmission or reception.

The set-top box 250 may further include a media input unit for media playback. The media input unit may be a Blu-ray input unit (not shown), for example. That is, the set-top box 250 may include a Blu-ray player. After signal processing such as demultiplexing or decoding in the signal processor 260, a media signal from a Blu-ray disc may be transmitted to the display device 300 through the external device interface 265 so as to be displayed on the display device 300.

The display device 300 may include a tuner 270, an external device interface 273, a demodulator 275, a memory 278, a controller 280, a user input interface 283, a display 290, and an audio output unit 295.

The tuner 270, the demodulator 275, the memory 278, the controller 280, the user input interface 283, the display 290 and the audio output unit 295 are identical respectively to the tuner 110, the demodulator 120, the memory 140, the controller 170, the user input interface 150, the display 180, and the audio output unit 185 illustrated in FIG. 6 and thus a description thereof is not provided herein.

The external device interface 273 serves as an interface between the display device 300 and a wireless or wired external device, particularly the set-top box 250, for data transmission or reception.

Hence, a video signal or an audio signal received through the set-top box 250 is output through the display 180 or through the audio output unit 185 under control of the controller 170.

Referring to FIG. 8, the configuration of the set-top box 250 and the display device 300 shown in FIG. 8 is similar to that of the set-top box 250 and the display device 300 shown in FIG. 7, except that the tuner 270 and the demodulator 275 reside in the set-top box 250, not in the display device 300. Thus the following description will focus upon such difference.

The signal processor 260 may process a broadcast signal received through the tuner 270 and the demodulator 275. The user input interface 263 may receive a channel selection input, a channel store input, etc.

Figure 9:
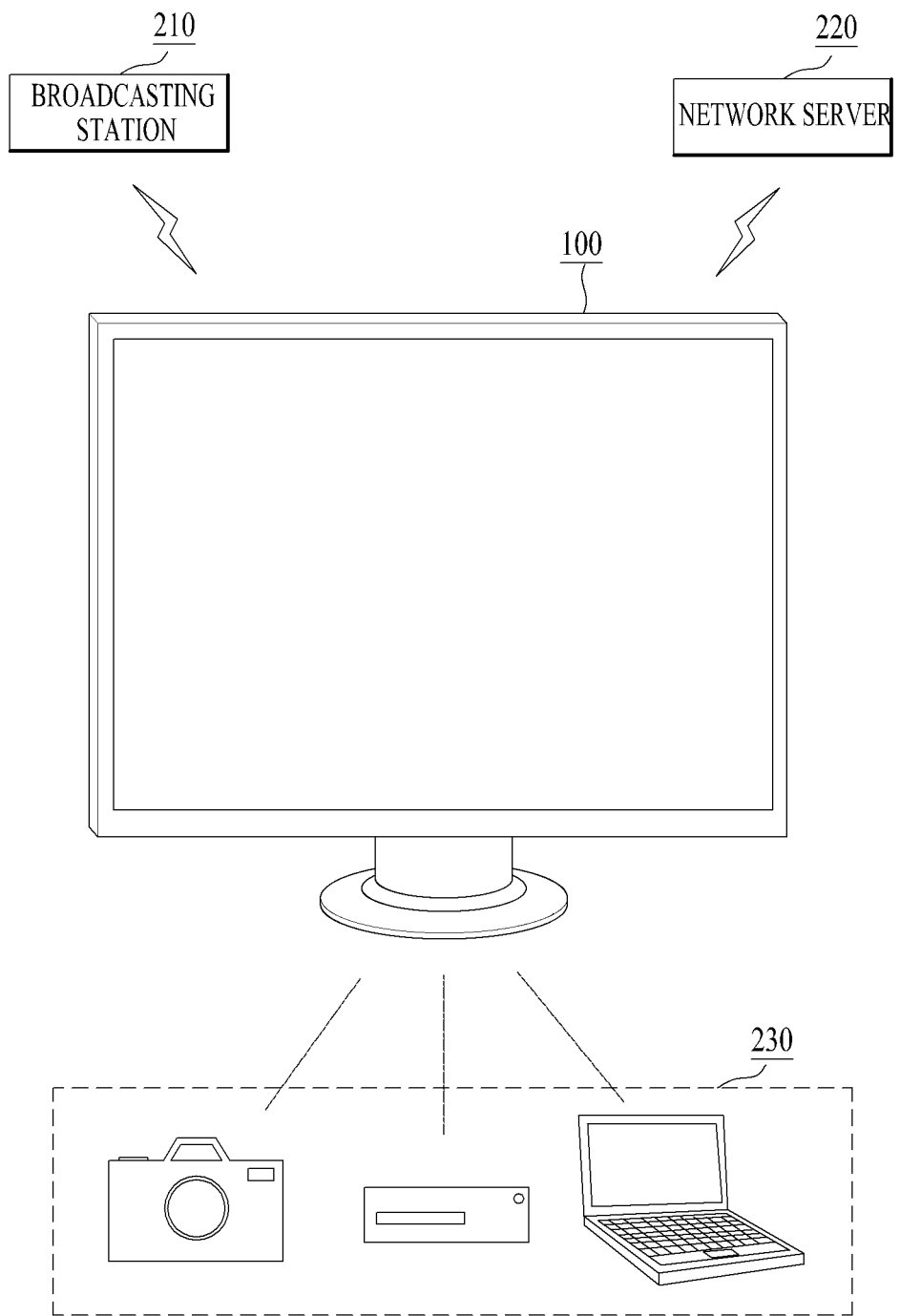
FIG. 9 is a diagram illustrating an operation for communicating with third devices in either of the image display devices according to the embodiments of the present invention.

FIG. 9 is a diagram illustrating an operation for communicating with third devices in either of the image display devices according to the embodiments of the present invention. The image display device shown in FIG. 9 may be one of the above-described image display devices according to the embodiments of the present invention.

As shown in FIG. 9, the image display device 100 according to the embodiment of the present invention may communicate with a broadcast station 210, a network server 220, or an external device 230.

The image display device 100 may receive a broadcast signal including a video signal from the broadcast station 210. The image display device 100 may process the audio and video signals of the broadcast signal or the data signal of the broadcast signal, suitably for output from the image display device 100. The image display device 100 may output video or audio based on the processed video or audio signal.

Meanwhile, the image display device 100 may communicate with the network server 220. The network server 220 is capable of transmitting signals to and receiving signals from the image display device 100 over a network. For example, the network server 220 may be a portable terminal that can be connected to the image display device 100 through a wired or wireless base station. In addition, the network server 220 may provide content to the image display device 100 over the Internet. A CP may provide content to the image display device 100 through the network server.

The image display device 100 may communicate with the external device 230. The external device 230 can transmit and receive signals directly to and from the image display device 100 wirelessly or by wire. For instance, the external device 230 may be a media storage or player. That is, the external device 230 may be any of a camera, a DVD player, a Blu-ray player, a PC, etc.

The broadcast station 210, the network server 220 or the external device 230 may transmit a signal including a video signal to the image display device 100. The image display device 100 may display an image based on the video signal included in the received signal. Also, the image display device 100 may transmit a signal transmitted from the network server 220 to the broadcast station 210 to the external device 230 and may transmit a signal transmitted from the external device 230 to the image display device 100 to the broadcast station 210 or the network server 220. That is, the image display device 100 may transmit content included in signals received from the broadcast station 210, the network server 220, and the external device 230 or may immediately play back the content.

Figure 10:
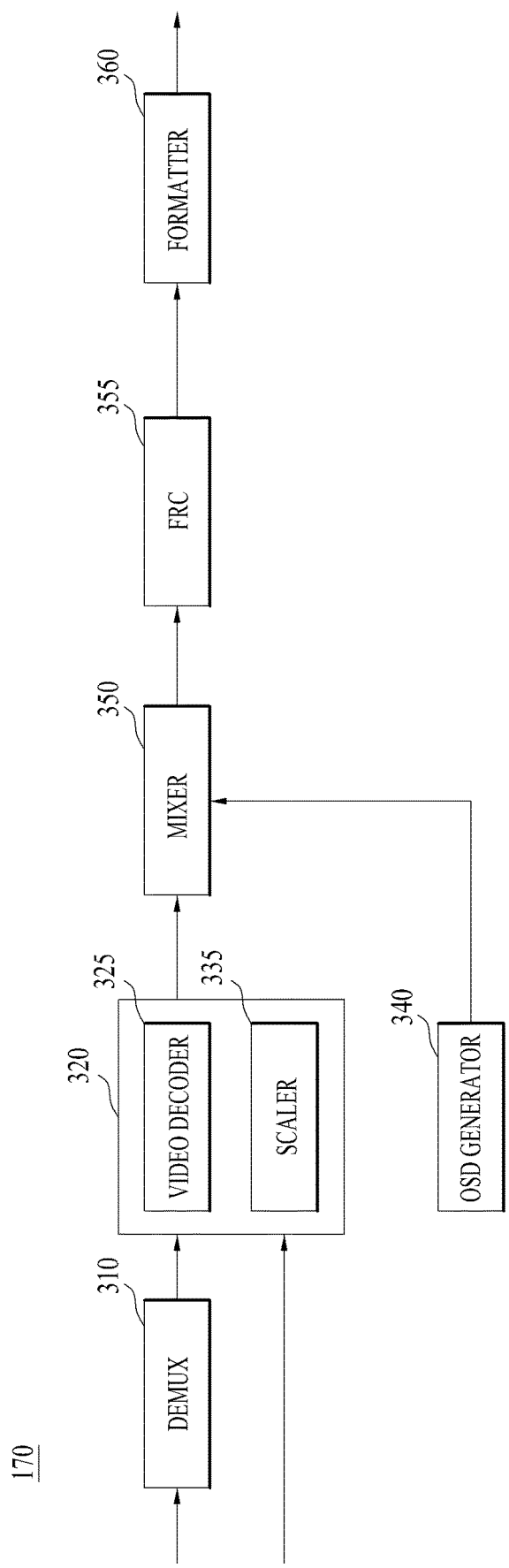
FIG. 10 is a block diagram of a controller shown in FIG. 6.

FIG. 10 is a block diagram of the controller shown in FIG. 6. The controller will be described with reference to FIGS. 10 and 6.

The controller 170 may include a DEMUX 310, a video processor 320, an OSD generator 340, a mixer 350, a Frame Rate Converter (FRC) 355, and a formatter 360 according to an embodiment of the present invention. The controller 170 may further include an audio processor (not shown) and a data processor (not shown).

The DEMUX 310 demultiplexes an input stream. For example, the DEMUX 310 may demultiplex an MPEG-2 TS into a video signal, an audio signal, and a data signal. The stream signal input to the DEMUX 310 may be received from the tuner 110, the demodulator 120 or the external device interface 135.

The video processor 320 may process the demultiplexed video signal. For video signal processing, the video processor 320 may include a video decoder 325 and a scaler 335.

The video decoder 325 decodes the demultiplexed video signal and the scaler 335 scales the decoded video signal so that the video signal can be displayed on the display 180.

The video decoder 325 may be provided with decoders that operate based on various standards.

If the demultiplexed video signal is, for example, an MPEG-2 encoded video signal, the video signal may be decoded by an MPEG-2 decoder.

On the other hand, if the video signal is an H.264-encoded DMB or DVB-handheld (DVB-H) signal, the video signal may be decoded by an H.264 decoder.

The video signal decoded by the video processor 320 is provided to the mixer 350.

The OSD generator 340 generates an OSD signal autonomously or according to user input. For example, the OSD generator 340 may generate signals by which a variety of information is displayed as graphics or text on the display 180, based on control signals received from the user input interface 150. The generated OSD signal may include various data such as a UI screen, a variety of menu screens, widgets, icons, etc. of the image display device 100

For example, the OSD generator 340 may generate a signal by which subtitles are displayed for a broadcast image or Electronic Program Guide (EPG)-based broadcasting information.

The mixer 350 may mix the decoded video signal processed by the image processor with the OSD signal generated by the OSD generator 340 and output the mixed signal to the formatter 360. As the decoded broadcast video signal or the externally input signal is mixed with the OSD signal, an OSD may be overlaid on the broadcast image or the externally input image.

The FRC 355 may change the frame rate of an input image signal. For example, a frame rate of 60 Hz is converted into a frame rate of 120 or 240 Hz. When the frame rate is to be changed from 60 Hz to 120 Hz, a first frame is inserted between the first frame and a second frame, or a predicted third frame is inserted between the first and second frames. If the frame rate is to be changed from 60 Hz to 240 Hz, three identical frames or three predicted frames are inserted between the first and second frames. It is also possible to maintain the frame rate of the input image without frame rate conversion.

The formatter 360 changes the format of the signal received from the FRC 355 to suit the display 180. For example, the formatter 360 may convert a received signal into an RGB data signal. The RGB signal may be output in the form of a Low Voltage Differential Signal (LVDS) or mini-LVDS.

The audio processor (not shown) of the controller 170 may process the demultiplexed audio signal. For audio signal processing, the audio processor (not shown) may have a plurality of decoders.

If the demultiplexed audio signal is a coded audio signal, the audio processor (not shown) of the controller 170 may decode the audio signal. For example, the demultiplexed audio signal may be decoded by an MPEG-2 decoder, an MPEG-4 decoder, an Advanced Audio Coding (AAC) decoder, or an AC-3 decoder.

The audio processor (not shown) of the controller 170 may also adjust the bass, treble or volume of the audio signal.

The data processor (not shown) of the controller 170 may process the demultiplexed data signal. For example, if the demultiplexed data signal is an encoded data signal such as an Electronic Program Guide (EPG) which includes broadcast information specifying the start time, end time, etc. of scheduled broadcast programs of each channel, the controller 170 may decode the data signal. Examples of an EPG include ATSC-Program and System Information Protocol (PSIP) information and DVB-Service Information (SI).

ATSC-PSIP information or DVB-SI may be included in the header of the above-described TS, i.e., a 4-byte header of an MPEG-2 TS.

The block diagram of the controller 170 shown in FIG. 10 is an embodiment of the present invention. Depending upon the specifications of the controller 170, the components of the controller 170 may be combined, or omitted. Or new components may be added to the controller 170.

Figure 11:
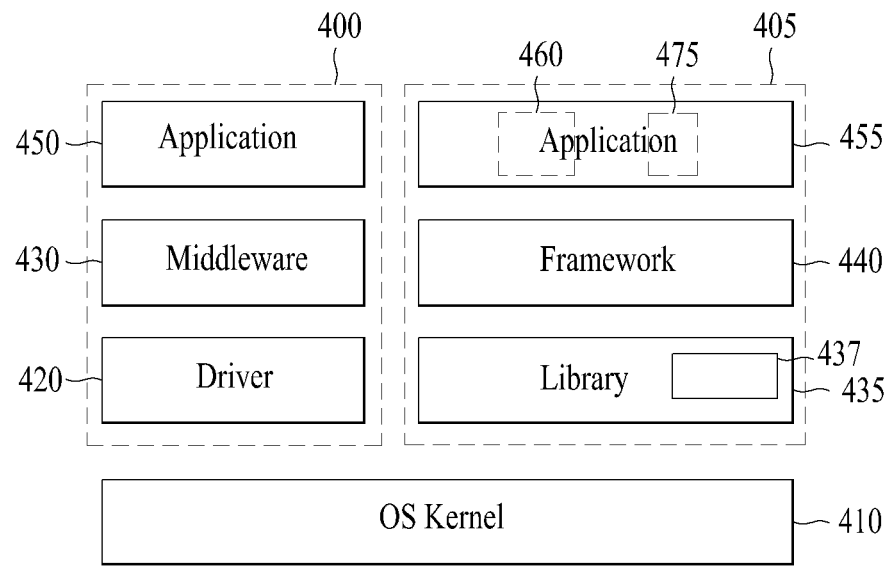
FIG. 11 is a diagram showing an example of a platform architecture for either of the image display devices according to the embodiments of the present invention.

FIG. 11 is a diagram showing an example of a platform architecture for either of the image display devices according to the embodiments of the present invention.

Figure 12:
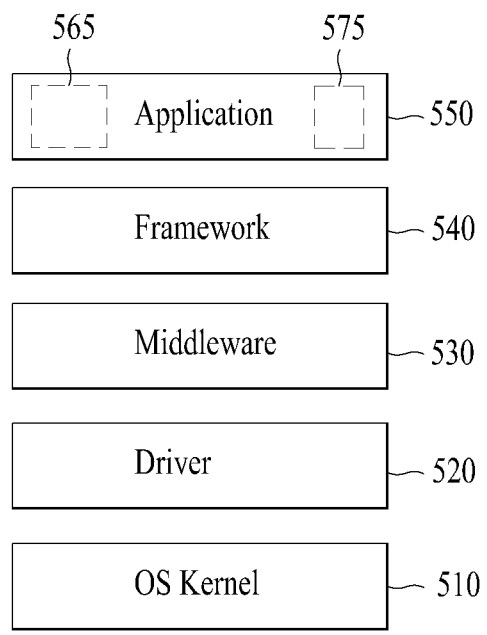
FIG. 12 is a diagram showing another example of a platform architecture for either of the image display devices according to the embodiments of the present invention.

FIG. 12 is a diagram showing another example of a platform architecture for either of the image display devices according to the embodiments of the present invention.

A platform for either of the image display devices according to the embodiments of the present invention may have OS-based software to implement the above-described various operations.

Referring to FIG. 11, a platform for either of the image display devices according to the embodiments of the present invention is of a separate type. The platform may be designed separately as a legacy system platform 400 and a smart system platform 405. An OS kernel 410 may be shared between the legacy system platform 400 and the smart system platform 405.

The legacy system platform 400 may include a stack of a driver 420, middleware 430, and an application layer 450 on the OS kernel 410.

On the other hand, the smart system platform 405 may include a stack of a library 435, a framework 440, and an application layer 455 on the OS kernel 410.

The OS kernel 410 is the core of an operating system. When the image display device is driven, the OS kernel 410 may be responsible for operation of at least one of control of hardware drivers, security protection for hardware and processors in the image display device, efficient management of system resources, memory management, hardware interfacing by hardware abstraction, multi-processing, or scheduling associated with multi-processing. Meanwhile, the OS kernel 410 may further perform power management.

The hardware drivers of the OS kernel 410 may include, for example, at least one of a display driver, a Wi-Fi driver, a Bluetooth driver, a USB driver, an audio driver, a power manager, a binder driver, or a memory driver.

Alternatively or additionally, the hardware drivers of the OS kernel 410 may be drivers for hardware devices within the OS kernel 410. The hardware drivers may include a character device driver, a block device driver, and a network device driver. The block device driver may require a buffer for buffering data on a block basis, because data is transmitted on a block basis. The character device driver may not need a buffer since data is transmitted on a basic data unit basis, that is, on a character basis.

The OS kernel 410 may be implemented based on any of various OSs such as Unix (Linux), Windows, etc. The OS kernel 410 may be a general-purpose open-source kernel which can be implemented in other electronic devices.

The driver 420 is interposed between the OS kernel 410 and the middleware 430. Along with the middleware 430, the driver 420 drives devices for operation of the application layer 450. For example, the driver 420 may include a driver(s) for a microcomputer, a display module, a Graphics Processing Unit (GPU), an FRC, a General-Purpose Input/Output (GPIO) pin, a High-Definition Multimedia Interface (HDMI), a System Decoder (SDEC) or DEMUX, a Video Decoder (VDEC), an Audio Decoder (ADEC), a Personal Video Recorder (PVR), and/or an Inter-Integrated Circuit (I2C). These drivers operate in conjunction with the hardware drivers of the OS kernel 410.

In addition, the driver 420 may further include a driver for the remote controller, especially a pointing device to be described below. The remote controller driver may reside in the OS kernel 410 or the middleware 430, instead of the driver 420.

The middleware 430 resides between the OS kernel 410 and the application layer 450. The middleware 430 may mediate between different hardware devices or different software programs, for data transmission and reception between the hardware devices or the software programs. Therefore, the middleware 430 can provide standard interfaces, support various environments, and enable interaction between tasks conforming to heterogeneous communication protocols.

Examples of the middleware 430 in the legacy system platform 400 may include Multimedia and Hypermedia information coding Experts Group (MHEG) and Advanced Common Application Platform (ACAP) as data broadcasting-related middleware, PSIP or SI middleware as broadcasting information-related middleware, and DLNA middleware as peripheral device communication-related middleware.

The application layer 450 that runs atop the middleware 430 in the legacy system platform 400 may include, for example, UI applications associated with various menus in the image display device. The application layer 450 on top of the middleware 430 may allow editing and updating over a network by user selection. Through the application layer 450, the user may navigate a desired menu by manipulating the remote controller while viewing a broadcast program.

The application layer 450 in the legacy system platform 400 may further include at least one of a TV guide application, a Bluetooth application, a reservation application, a Digital Video Recorder (DVR) application, and a hotkey application.

In the smart system platform 405, the library 435 is positioned between the OS kernel 410 and the framework 440, forming the basis of the framework 440. For example, the library 435 may include Secure Socket Layer (SSL) (a security-related library), WebKit (a Web engine-related library), c library (libc), and Media Framework (a media-related library) specifying, for example, a video format and an audio format. The library 435 may be written in C or C++. Also, the library 435 may be exposed to a developer through the framework 440.

The library 435 may include a runtime 437 with a core Java library and a Virtual Machine (VM). The runtime 437 and the library 435 form the basis of the framework 440.

The VM may be a virtual machine that enables concurrent execution of a plurality of instances, that is, multi-tasking. For each application of the application layer 455, a VM may be allocated and executed. For scheduling or interconnection between the plurality of instances, the binder driver (not shown) of the OS kernel 410 may operate.

The binder driver and the runtime 437 may connect Java applications to C-based libraries.

The library 435 and the runtime 437 may correspond to the middleware 430 of the legacy system platform.

In the smart system platform 405, the framework 440 includes programs on which applications of the application layer 455 are based. The framework 440 is compatible with any application and may allow component reuse, movement or exchange. The framework 440 may include supporting programs and programs for interconnecting different software components. For example, the framework 440 may include an activity manager related to activities of applications, a notification manager, and a CP for abstracting common information between applications. This framework 440 may be written in Java.

The application layer 455 on top of the framework 440 includes a variety of programs that can be executed and displayed in the image display device. The application layer 455 may include, for example, a core application that is a suite providing at least one of e-mail, Short Message Service (SMS), calendar, map, or browser functions. The application layer 455 may be written in Java.

In the application layer 455, applications may be categorized into user-undeletable applications 465 stored in the image display device or user-deletable applications 475 that are downloaded from an external device or a network and stored in the image display device.

Using the applications of the application layer 455, a variety of functions such as an Internet telephony service, VoD service, Web album service, Social Networking Service (SNS), Location-Based Service (LBS), map service, Web browsing service, and application search service may be performed through network access. In addition, other functions such as gaming and schedule management may be performed by the applications.

Referring to FIG. 12, a platform for any of the image display devices according to the embodiments of the present invention is of an integrated type. The integrated-type platform may include an OS kernel 510, a driver 520, middleware 530, a framework 540, and an application layer 550.

The integrated-type platform shown in FIG. 11 is different from the separate-type platform shown in FIG. 11 in that the library 435 shown in FIG. 11 is deleted and the application layer 550 is included as an integrated layer. The driver 520 and the framework 540 correspond to the driver 420 and the framework 440 of FIG. 11, respectively.

The library 435 of FIG. 11 may be incorporated into the middleware 530 of FIG. 12. That is, the middleware 530 may include both the legacy system middleware and the image display system middleware. As described before, the legacy system middleware includes MHEG or ACAP as data broadcasting-related middleware, PSIP or SI middleware as broadcasting information-related middleware, and DLNA middleware as peripheral device communication-related middleware, and the image display system middleware includes SSL as a security-related library, WebKit as a Web engine-related library, libc, and Media Framework as a media-related library. The middleware 530 may further include the above-described runtime.

The application layer 550 may include a menu-related application, a TV guide application, a reservation application, etc. as legacy system applications, and e-mail, SMS, a calendar, a map, and a browser as image display system applications.

In the application layer 550, applications may be categorized into user-undeletable applications 1265 that are stored in the image display device and user-installable or user-deletable applications 1275 that are downloaded from an external device or a network and stored in the image display device.

The platforms shown in FIGS. 11 and 12 may be general-purpose ones that can be implemented in many other electronic devices as well as in image display devices. The platforms of FIGS. 11 and 12 may be stored or loaded in the memory 140, the controller 170, or any other processor (not shown) or may be stored or load in the SI & metadata DB 711, the UI manager 714 or the service manager 713 shown in FIG. 5. To execute applications, an additional application processor (not shown) may be further provided.

Figure 13:
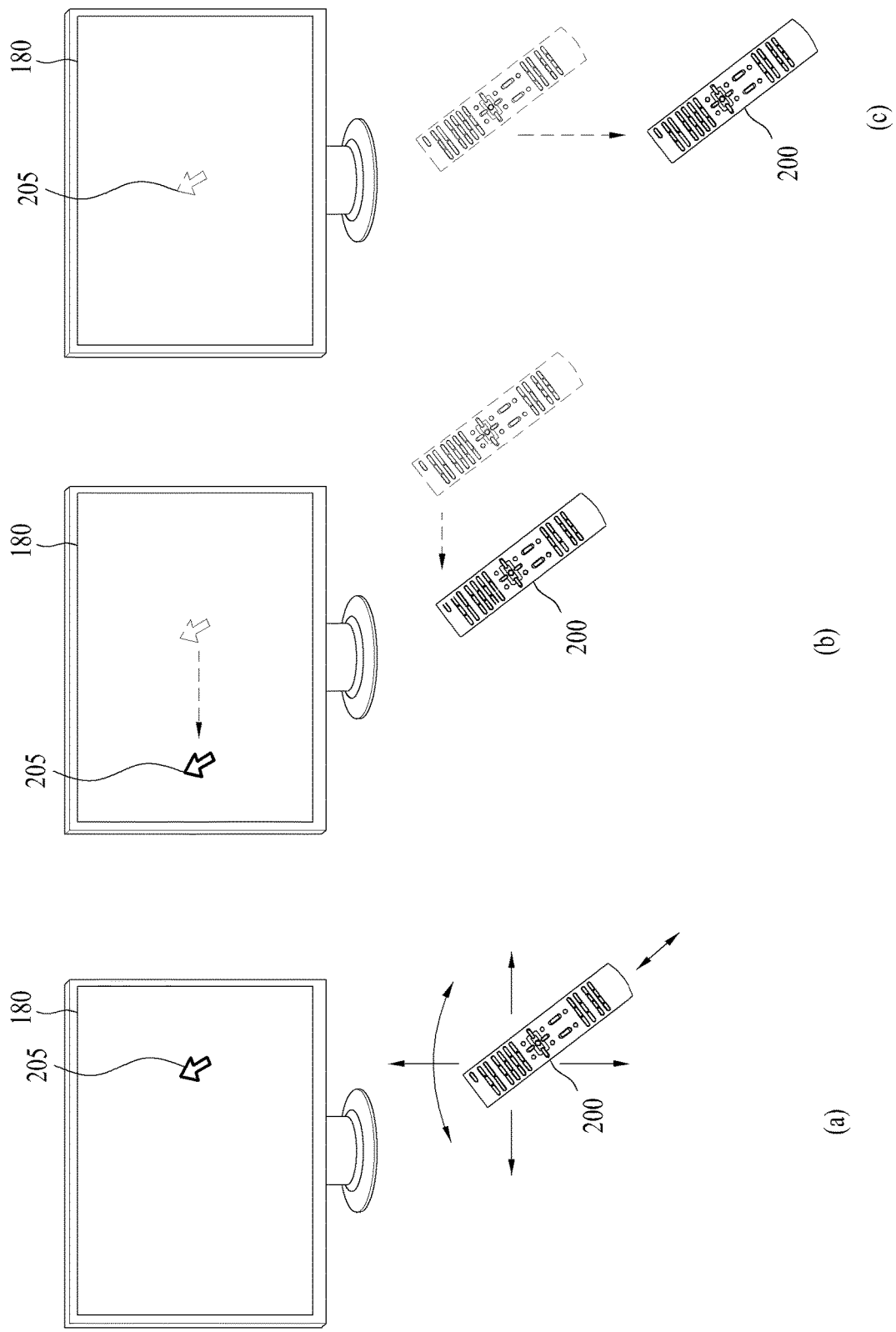
FIG. 13 is a diagram showing a method of operating a remote controller for controlling any one of the image display devices according to the embodiments of the present invention.

FIG. 13 illustrates a method for controlling either of the image display devices according to the embodiments of the present invention using a remote controller.

FIG. 13(*a*) illustrates a pointer 205 representing movement of the remote controller 200 displayed on the display 180.

The user may move or rotate the remote controller 200 up and down, side to side (FIG. 13(*b*)), and back and forth (FIG. 13(*c*)). The pointer 205 displayed on the display 180 of the image display device
moves according to the movement of the remote controller 200. Since the pointer 205 moves in accordance with the movement of the remote controller 200 in a 3D space as shown in FIG. 13, the remote controller 200 may be referred to as a pointing device.

Referring to FIG. 13(*b*), if the user moves the remote controller 200 to the left, the pointer 205 moves to the left on the display 180.

A sensor of the remote controller 200 detects movement of the remote controller 200 and transmits motion information of the remote controller 200 to the image display device. Then, the image display device calculates the coordinates of the pointer 205 from the motion information of the remote controller 200. The image display device then displays the pointer 205 at the calculated coordinates.

Referring to FIG. 13(*c*), while pressing a predetermined button of the remote controller 200, the user moves the remote controller 200 away from the display 180. Then, a selected area corresponding to the pointer 205 may be zoomed in on and enlarged on the display 180. On the contrary, if the user moves the remote controller 200 toward the display 180, the selected area corresponding to the pointer 205 is zoomed out and thus contracted on the display 180. On the contrary, when the remote controller 200 moves away from the display 180, the selected area may be zoomed out and when the remote controller 200 approaches the display 180, the selected area may be zoomed in.

With the predetermined button of the remote controller 200 pressed, the up, down, left and right movements of the remote controller 200 may be ignored. That is, when the remote controller 200 moves away from or approaches the display 180, only the back and forth movements of the remote controller 200 are sensed, while the up, down, left and right movements of the remote controller 200 are ignored. Unless the predetermined button is pressed in the remote controller 200, the pointer 205 moves in accordance with the up, down, left or right movement of the remote controller 200.

The movement speed and direction of the pointer 205 may correspond to the movement speed and direction of the remote controller 200.

The pointer of the present specification is an object displayed on the display 180 in correspondence with the movement of the remote controller 200. Therefore, the pointer 205 may have various shapes other than the arrow illustrated in FIG. 13. For example, the pointer 205 may be a dot, a cursor, a prompt, a thick outline, etc. The pointer 205 may be displayed across a plurality of points, such as a line and a surface, as well as at a single point on horizontal and vertical axes.

Figure 14:
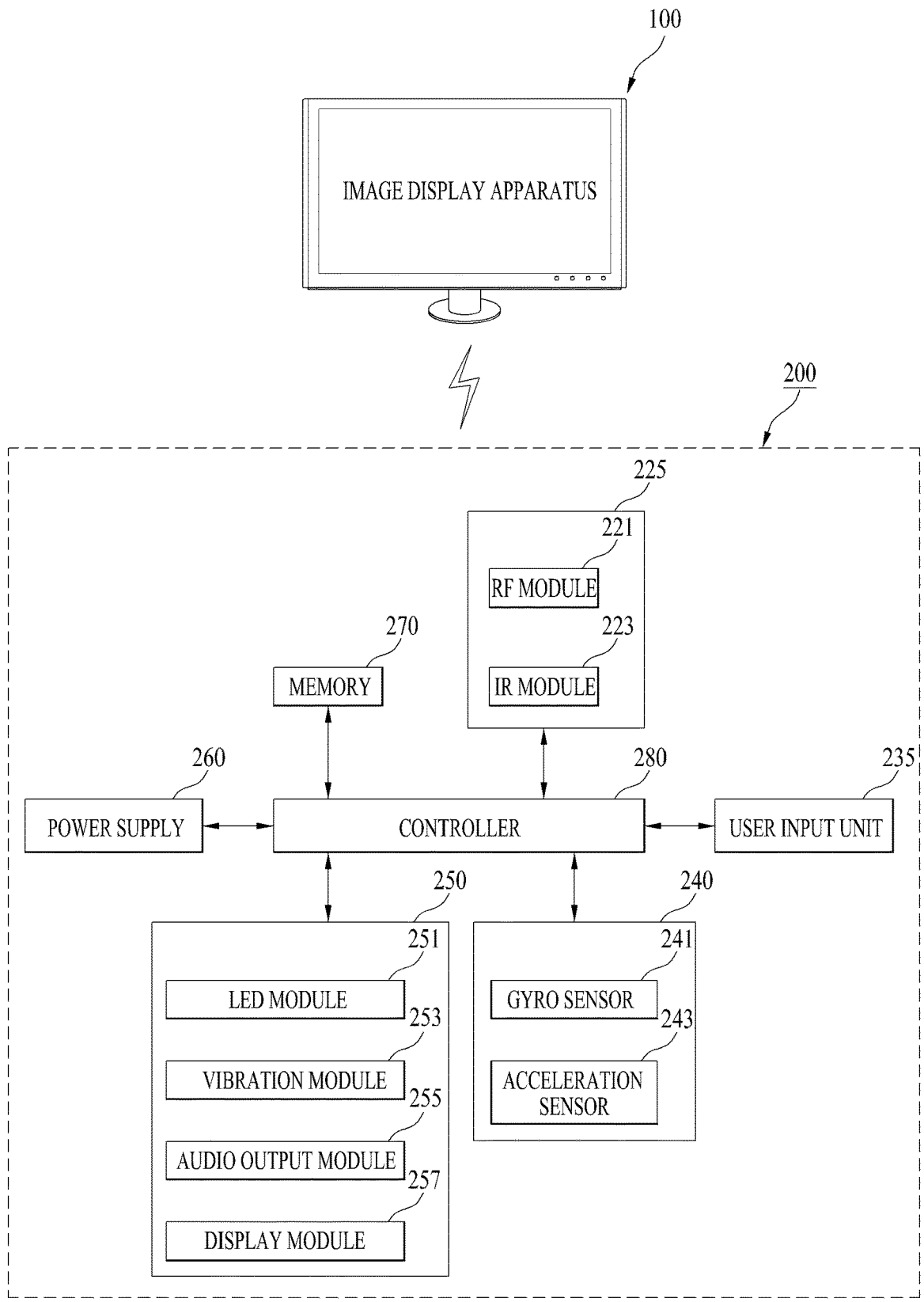
FIG. 14 is a block diagram of a remote controller for controlling either of the image display devices according to the embodiments of the present invention.

FIG. 14 is a detailed block diagram of the remote controller in either of the image display devices according to an embodiment of the present invention.

Referring to FIG. 14, the remote controller 200 may include a wireless communication module 225, a user input unit 235, a sensor unit 240, an output unit 250, a power supply 260, a memory 270, and a controller 280.

The wireless communication module 225 transmits signals to and/or receives signals from either of the above-described image display devices according to the embodiments of the present invention, that is, the image display device 100.

The remote controller 200 may include an RF module 1421 for transmitting RF signals to and/or receiving RF signals from the image display device 100 according to an RF communication standard. The remote controller 200 may also include an IR module 223 for transmitting IR signals to and/or receiving IR signals from the image display device 100 according to an IR communication standard.

In the present embodiment, the remote controller 200 transmits motion information representing movement of the remote controller 200 to the image display device 100 through the RF module 221.

The remote controller 200 may also receive signals from the image display device 100 through the RF module 221. As needed, the remote controller 200 may transmit commands such as a power on/off command, a channel switch command, or a volume change command to the image display device 100 through the IR module 223.

The user input unit 235 may include a keypad, a plurality of buttons, a touchpad and/or a touchscreen. The user may enter commands associated with the image display device 100 to the remote controller 200 by manipulating the user input unit 235. If the user input unit 235 includes a plurality of hard buttons, the user may input various commands associated with the image display device 100 to the remote controller 200 by pressing the hard buttons. Alternatively or additionally, if the user input unit 235 includes a touchscreen displaying a plurality of soft keys, the user may input various commands associated with the image display device 100 to the remote controller 200 by touching the soft keys. The user input unit 235 may also include various input tools other than those set forth herein, such as a scroll key and/or a jog wheel, which should not be construed as limiting the present invention.

The sensor unit 240 may include a gyro sensor 241 and/or an acceleration sensor 243.

The gyro sensor 241 may sense movement of the remote controller 200.

For example, the gyro sensor 241 may sense movement of the remote controller 200 in X, Y, and Z-axis directions. The acceleration sensor 243 may sense the speed of the remote controller 200. The sensor unit 240 may further include a distance sensor for sensing the distance between the remote controller 200 and the display device 100.

The output unit 250 may output a video and/or audio signal corresponding to manipulation of the user input unit 235 or corresponding to a signal received from the image display device 100. The user may easily identify whether the user input unit 235 has been manipulated or whether the image display device 100 has been controlled, based on the video and/or audio signal output by the output unit 250.

The output unit 250 may include a Light Emitting Diode (LED) module 251 which is turned on or off whenever the user input unit 235 is manipulated or whenever a signal is received from or transmitted to the image display device 100 through the wireless communication module 225, a vibration module 253 which generates vibrations, an audio output module 255 which outputs audio data, and/or a display module 257 which outputs video data.

The power supply 260 supplies power to the remote controller 200. If the remote controller 200 remains stationary for a predetermined time or longer, the power supply 260 may, for example, reduce or shut off supply of power to the spatial remote controller 200 in order to save power. The power supply 260 may resume power supply if a predetermined key of the remote controller 200 is manipulated.

The memory 270 may store various types of programs and application data necessary to control or drive the remote controller 200. The remote controller 200 may wirelessly transmit signals to and/or receive signals from the image display device 100 over a predetermined frequency band with the aid of the RF module 221. The controller 280 of the remote controller 200 may store information regarding the frequency band used for the remote controller 200 to wirelessly transmit signals to and/or wirelessly receive signals from the paired image display device 100 in the memory 270, for later use.

The controller 280 provides overall control to the remote controller 200. The controller 280 may transmit a signal corresponding to a key manipulation detected from the user input unit 235 or a signal corresponding to motion of the remote controller 200, as sensed by the sensor unit 240, to the image display device 100.

Figure 15:
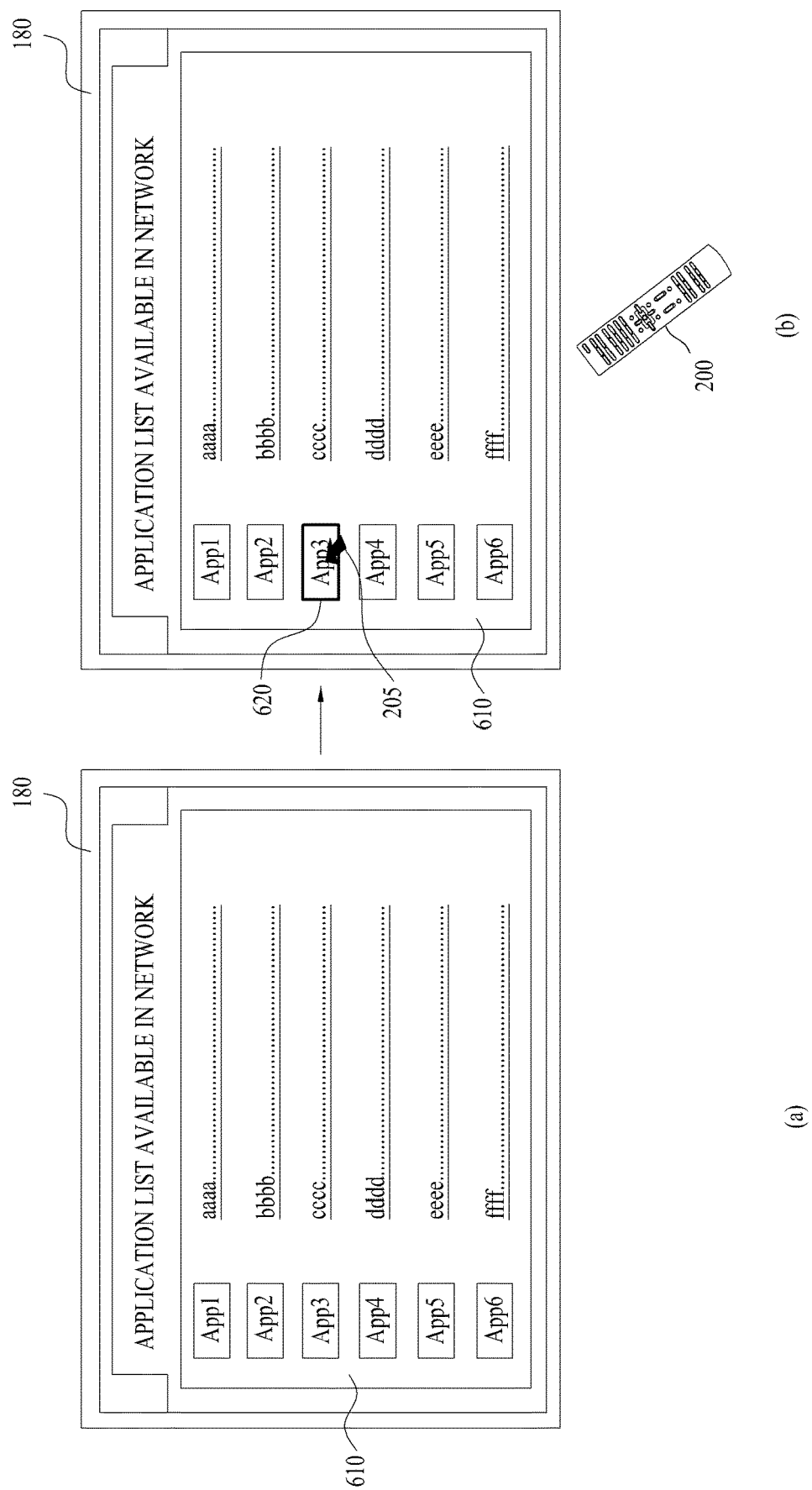
FIG. 15 is a diagram showing a first embodiment of a user interface (UI) in either of the image display devices according to the embodiments of the present invention.

FIG. 15 is a diagram showing a first embodiment of a UI in either of the image display devices according to embodiments of the present invention.

Figure 16:
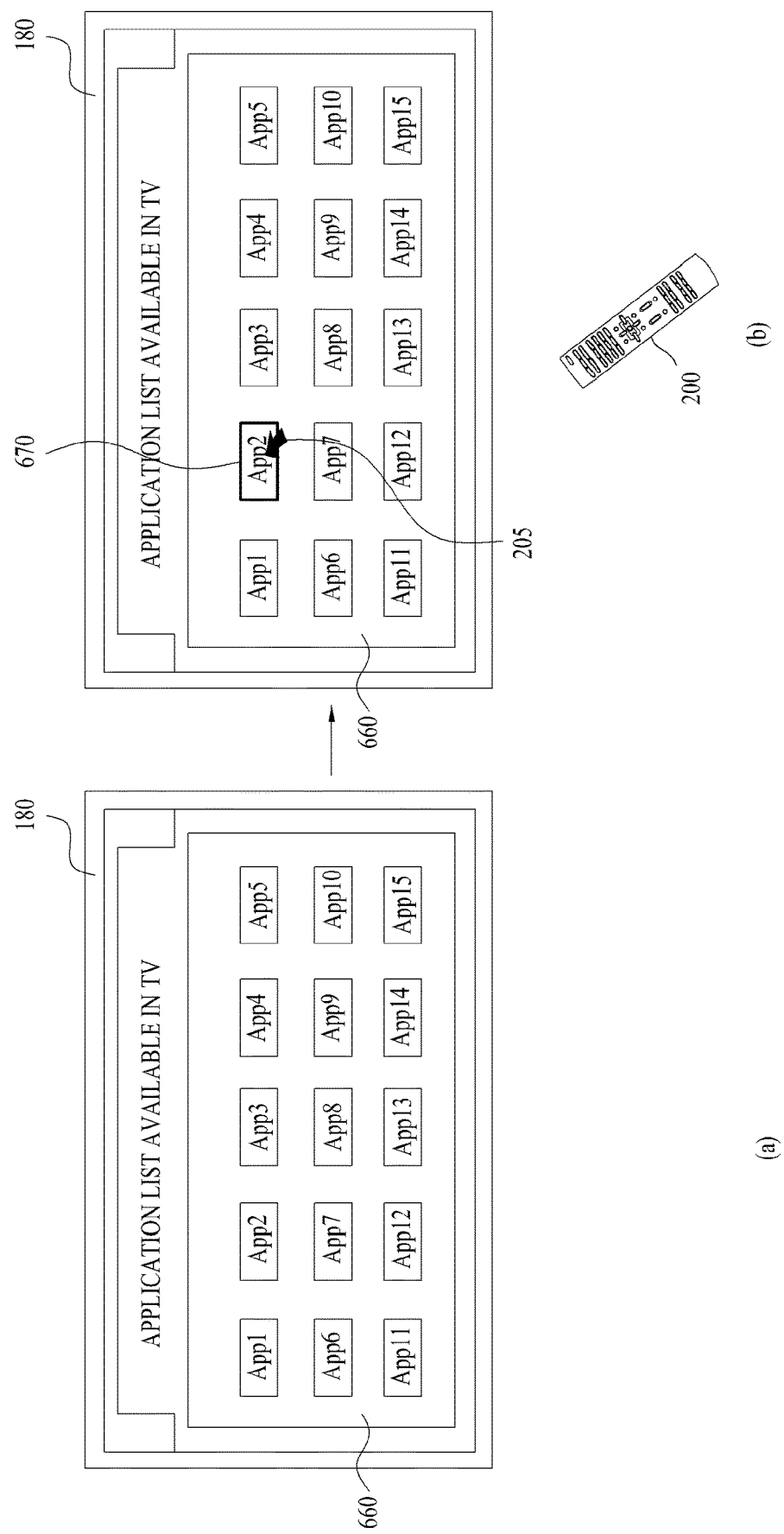
FIG. 16 is a diagram showing a second embodiment of a UI in either of the image display devices according to the embodiments of the present invention.

FIG. 16 is a diagram showing a second embodiment of a UI in either of the image display devices according to the embodiments of the present invention.

Figure 17:
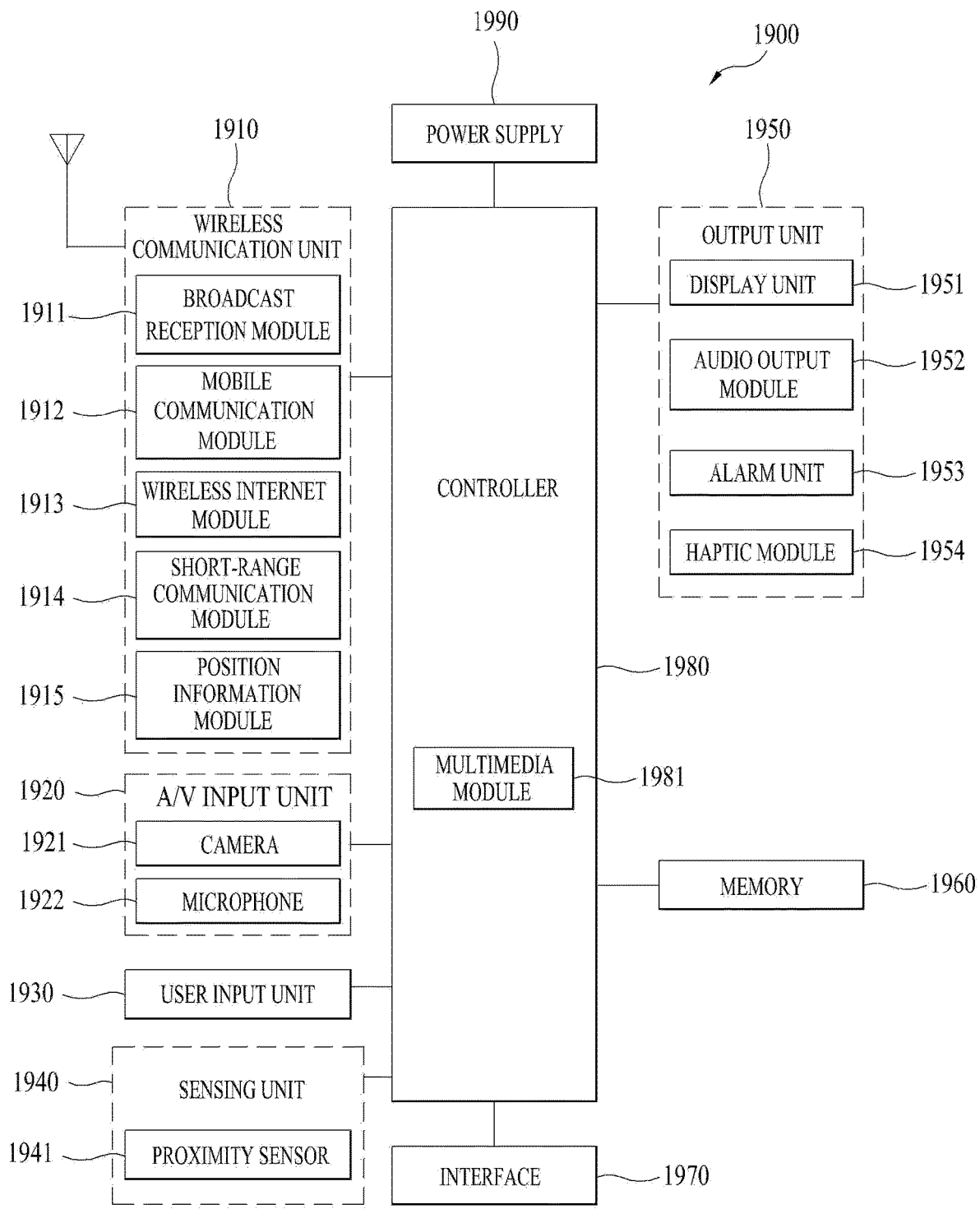
FIG. 17 is a block diagram of a user terminal related to an embodiment of the present invention.

FIG. 17 is a diagram showing a third embodiment of a UI in either of the image display devices according to the embodiments of the present invention.

The user terminal is a mobile terminal 1900 and includes a wireless communication module 1910, an audio/video (A/V) input unit 1920, a user input unit 1930, a sensing unit 1940, an output unit 1950, a memory 1960, an interface 1970, a controller 1980, and a power supply 1990. Since the components shown in FIG. 17 are not mandatory, the number of components included in the mobile terminal may be increased or decreased.

Hereinafter, the above components will be sequentially described.

The wireless communication module 1910 may include one or more modules for performing wireless communication between the mobile terminal 1900 and a wireless communication system or the mobile terminal 1900 and a network in which the mobile terminal 1900 is located. For example, the wireless communication module 1910 may include a broadcast reception module 1911, a mobile communication module 1912, a wireless Internet module 1913, a short-range communication module 1914 and a position information module 1915.

The broadcast reception module 1911 receives a broadcast signal and/or broadcast-related information from an external broadcast management server through a broadcast channel.

The mobile communication module 1912 transmits or receives a wireless signal to or from at least one of a base station, an external terminal and a server over a mobile communication network. The wireless signal may include a voice call signal, a video call signal or various types of data associated with transmission and reception of a text/multimedia message.

The wireless Internet module 1913 is an internal or external module for wireless Internet access which may be provided to the mobile terminal 1900. For wireless Internet access, a Wireless Local Area Network (WLAN) (i.e., Wi-Fi), Wireless Broadband (Wibro), World Interoperability for Microwave Access (WiMax), and High Speed Downlink Packet Access (HSDPA) may be used.

The short-range communication module 1914 performs short range communication. For short-range wireless communication, Bluetooth, Radio-Frequency IDentification (RFID), Infrared Data Association (IrDA), Ultra WideBand (UWB), and ZigBee may be used.

The wireless Internet module 1913 or the short-range communication module 1914 may transmit or receive data to or from a predetermined image display device such that the user terminal is used as a user controller of a predetermined game application.

For example, when a user searches the image display device for a user terminal connected over a network and a user terminal to be used as a user controller is selected during search, the image display device may transmit a predetermined control signal to the wireless communication unit of the selected user terminal and performs an operation for using the selected terminal as the user controller. If the user inputs a predetermined signal through the user terminal, the user terminal may transmit the predetermined signal to the image display device through the wireless communication unit so as to play the game application.

The position information module 1915 acquires the position of the mobile terminal and representative examples thereof include a Global Position System (GPS) module.

Referring to FIG. 17, the A/V input unit 1920 inputs an audio signal or a video signal and may include a camera 1921 and a microphone 1922. The camera 1921 processes an image frame such as a still image or a moving image obtained by an image sensor in a video communication mode or an image capture mode. The processed image frame may be displayed on the display 1951.

The microphone 1922 receives an external audio signal in a call mode, a recording mode or a voice recognition mode and processes the audio signal into electrical voice data. The microphone 1922 may perform various noise elimination algorithms for eliminating noise occurring when the external audio signal is received.

The user input unit 1930 generates input data enabling the user to control the operation of the terminal. The user input unit 1930 may include a keypad, a dome switch, a touchpad (static pressure/static The sensing unit 1940 may sense a current state of the mobile terminal 1900, such as an open/closed state of the mobile terminal 1900, a location of the mobile terminal 1900, whether the user is in contact, an orientation of the mobile terminal, acceleration/deceleration of the mobile terminal, to generate a sensing signal for controlling the operation of the mobile terminal 1900. For example, when the mobile terminal 1900 is in a form of a slide phone, the slide phone is opened or closed may be sensed. In addition, whether the power supply 1990 has supplied power, whether the interface 1970 is coupled to an external device, and the like may also be sensed. In one example, the sensing unit 1940 may include a proximity sensor 1941.

The sensing unit 1940 may generate a signal to be used as a predetermined game play signal if the user terminal is used as a user controller of a predetermined game application which is being executed by the image display device according to the embodiment.

The output unit 1950 is provided to output an audio or video signal or a tactile signal and may include the display unit 1951, an audio output module 1952, an alarm unit 1953, and a haptic module 1954.

The display unit 1951 displays (outputs) information processed in the mobile terminal 1900. For example, when the mobile terminal 1900 is in a communication mode, the display unit 1951 displays a communication-related User Interface (UI) or Graphical User Interface (GUI). When the mobile terminal 1900 is in a video communication mode or an image capture mode, the display unit 1951 may display captured or received images and may display a corresponding UI or GUI.

The display unit 1951 may include at least one of a liquid crystal display (LCD), a thin film transistor-liquid crystal display (TFT-LCD), an organic light-emitting diode (OLED), a flexible display, and a 3D display.

A part of the above displays may be a transparent or light-transmittable display. Representative examples of the transparent display include a Transparent OLED (TOLED). The back side of the display unit 1951 may have a light-transmittable structure. By this structure, the user may view an object located on the back side of the terminal body through an area corresponding to the display unit 1951 of the terminal body.

The display unit 1951 may output a predetermined game play screen if the user terminal 1900 is used as a user controller of a game application which is being executed in a predetermined image display device.

Two or more display units 1951 may be provided according to implementations of the mobile terminal 1900. For example, a plurality of display units may be separately or integrally provided on one surface of the mobile terminal 1900 or may be respectively provided on different surfaces of the mobile terminal 1900.

If the display unit 1951 and a sensor (hereinafter, referred to as a touch sensor) for detecting a touch operation have a layered structure (hereinafter, referred to as a touchscreen), the display unit 1951 may function as an input device as well as an output device. The touch sensor may be a touch film, a touch sheet or a touch pad.

The touch sensor may be configured to convert a change in pressure applied to a specific portion of the display unit 1951 or a change in capacitance generated in a specific portion of the display unit 1951 into an electrical input signal. The touch sensor may be configured to detect not only a touch location and area but also touch pressure.

If a touch input of the touch sensor is detected, a signal(s) corresponding thereto is sent to a touch controller. The touch controller processes the signal(s) and then transmits data corresponding to the processed signal(s) to the controller 1980. Thus, the controller 1980 may check which portion of the display unit 1951 is touched.

In the embodiment, if the user terminal is used as a user controller of a game application which is being executed by the image display device, the touch input of the touch sensor is used to play the game.

Referring to FIG. 17, the proximity sensor 1941 may be disposed near the touchscreen and an internal region of the mobile terminal surrounded by the touchscreen. The proximity sensor 1941 can detect the presence or absence of an object that is approaching or near to a predetermined detection surface without physical contact based on electromagnetic force or infrared rays. The proximity sensor has long life span and a wider variety of applications as compared to a contact sensor.

Examples of the proximity sensor 1941 include a transmission photoelectric sensor, a direct reflection photoelectric sensor, a mirror reflection photoelectric sensor, a high-frequency oscillation proximity sensor, a capacitive proximity sensor, a magnetic proximity sensor, and an infrared proximity sensor. If the touchscreen is static electrical, the proximity sensor is configured to detect the proximity of the pointer by a change in an electric field according to the proximity of the pointer. In this case, the touchscreen (touch sensor) may be regarded as a proximity sensor.

Hereinafter, for convenience of description, an action in which the pointer approaches the touchscreen without contact so as to recognize the location of the point on the touchscreen is referred to as "proximity touch" and an action in which the pointer contacts the touchscreen is referred to as "contact touch". A proximity touch location of the pointer on the touchscreen refers to a location in which the pointer vertically corresponds to the touchscreen when the proximity touch of the pointer is performed.

The proximity sensor 1941 detects proximity touch and proximity patterns (e.g., a proximity touch distance, a proximity touch direction, a proximity touch speed, a proximity touch time, a proximity touch location, a proximity touch movement state, etc.). Information corresponding to the detected proximity touch operation and proximity touch pattern may be output on the touchscreen.

The audio output module 1952 may output audio data received from the wireless communication module 1910 or stored in the memory 1960 in a call signal reception mode, a communication mode, a recording mode, a voice recognition mode, or a broadcast reception mode. The audio output module 1952 may output an audio signal associated with a function (e.g., an incoming call sound, a message reception sound, etc.) performed by the mobile terminal 1900. The audio output module 1952 may include a receiver, a speaker, a buzzer, etc.

The alarm unit 1953 outputs a signal notifying the user that an event has occurred in the mobile terminal 1900. Examples of the event occurring in the mobile terminal 1900 include incoming call reception, message reception, key signal input, and touch input. The alarm unit 1953 outputs a signal notifying the user of the occurrence of an event in a different form from the audio or video signal, that is, in the form of vibrations. Since the video signal or the audio signal may be output through the display unit 1951 or the audio output unit 1952, the display unit 1951 or the audio output unit 1952 may be regarded as the alarm unit 1953.

The haptic module 1954 generates a variety of tactile effects that the user can feel. A typical example of the tactile effect generated by the haptic module 1954 is vibration. The haptic module 1954 may adjust the intensity and pattern of vibration generated by the haptic module 1954. For example, the haptic module 1954 may combine different vibrations and output the combined vibration or sequentially output different vibrations.

In addition to vibration, the haptic module 1954 may generate various tactile effects such as a stimulus effect by an arrangement of pins that move perpendicular to the touched skin surface, a stimulus effect by air blowing or suction through an air outlet or inlet, a stimulus effect through brushing of the skin surface, a stimulus effect through contact with an electrode, a stimulus effect using electrostatic force, and a stimulus effect through temperature change using an endothermic or exothermic element.

The haptic module 1954 may be implemented so as to allow the user to perceive such effects not only through direct tactile sensation but also through kinesthetic sensation of fingers, hands, or the like of the user. Two or more vibration modules 1954 may be provided.

The memory 1960 may store a program for operation of the controller 1980 and may temporarily store input or output data (for example, a phonebook, messages, still images, and moving images). The memory 1960 stores data regarding vibrations and sounds of various patterns output when a touch input of the touchscreen is detected.

The memory 1960 may include a storage medium of at least one of a variety of types including a flash memory type, a hard disk type, a multimedia card micro type, a card memory type (for example, SD or XD memory), RAM, Static Random Access Memory (SRAM), ROM, Electrically Erasable Programmable Read-Only Memory (EEPROM), Programmable Read-Only Memory (PROM), magnetic memory, magnetic disk, optical disc. The mobile terminal 1900 may operate in association with a web storage that performs a storage function of the memory 1960 over the Internet.

The interface 1970 serves as an interface with all external devices connected to the mobile terminal 1900. The interface 1970 may receive data from an external device, receive power from and transmit power to the components of the mobile terminal 1900 or transmit data of the mobile terminal 1900 to an external device. Examples of the interface 1970 include a wired/wireless headset port, an external battery charger port, a wired/wireless data port, a memory card port, a port for connecting a device including an identity module, an audio Input/Output (I/O) terminal port, a video I/O terminal port, and an earphone port.

The identity module is a chip for storing a variety of information for authenticating use rights of the mobile terminal 1900 and includes a User Identity Module (UIM), a Subscriber Identity Module (SIM), a Universal Subscriber Identity Module (USIM), etc. The device (hereinafter, referred to as an identity device) including the identity module may be manufactured in the form of a smart card. Accordingly, the identity device may be connected to the terminal 1900 through a port.

The controller 1980 controls the overall operation of the mobile terminal 1900. For example, the controller 1980 performs control and processing associated with voice communication, data communication, video communication, and the like. The controller 1980 may include a multimedia playback module 1981 for multimedia reproduction. The multimedia playback module 1981 may be implemented in the controller 1980 or may be implemented separately from the controller 1980.

The controller 1980 may perform a pattern recognition process for recognizing handwriting input and drawing input performed on the touchscreen.

If the user terminal is used as a user controller of a game application which is being executed in the image display device, the controller 1980 may control output of predetermined game execution information on the display 1951 and transmission of a signal of each module or sensor of the user terminal to the image display device.

That is, according to the embodiment, if a predetermined signal indicating that the user terminal is selected as the user controller is received from the image display device, the controller 1980 controls reception of the predetermined game execution information through the wireless communication unit 1910, output of the predetermined game execution information to the display 1951, and transmission of a touch signal sensed by the touch sensor, a location change signal determined by a location information module, etc. to the image display device which is executing the game application through the wireless Internet module 1913 or the short-range communication module 1914.

Under control of the controller 1980, the power supply unit 1990 receives external power or internal power and supplies power required for operation to each component.

Hereinafter, the present invention will be described with reference to FIGS. 18 to 27.

Figure 18:
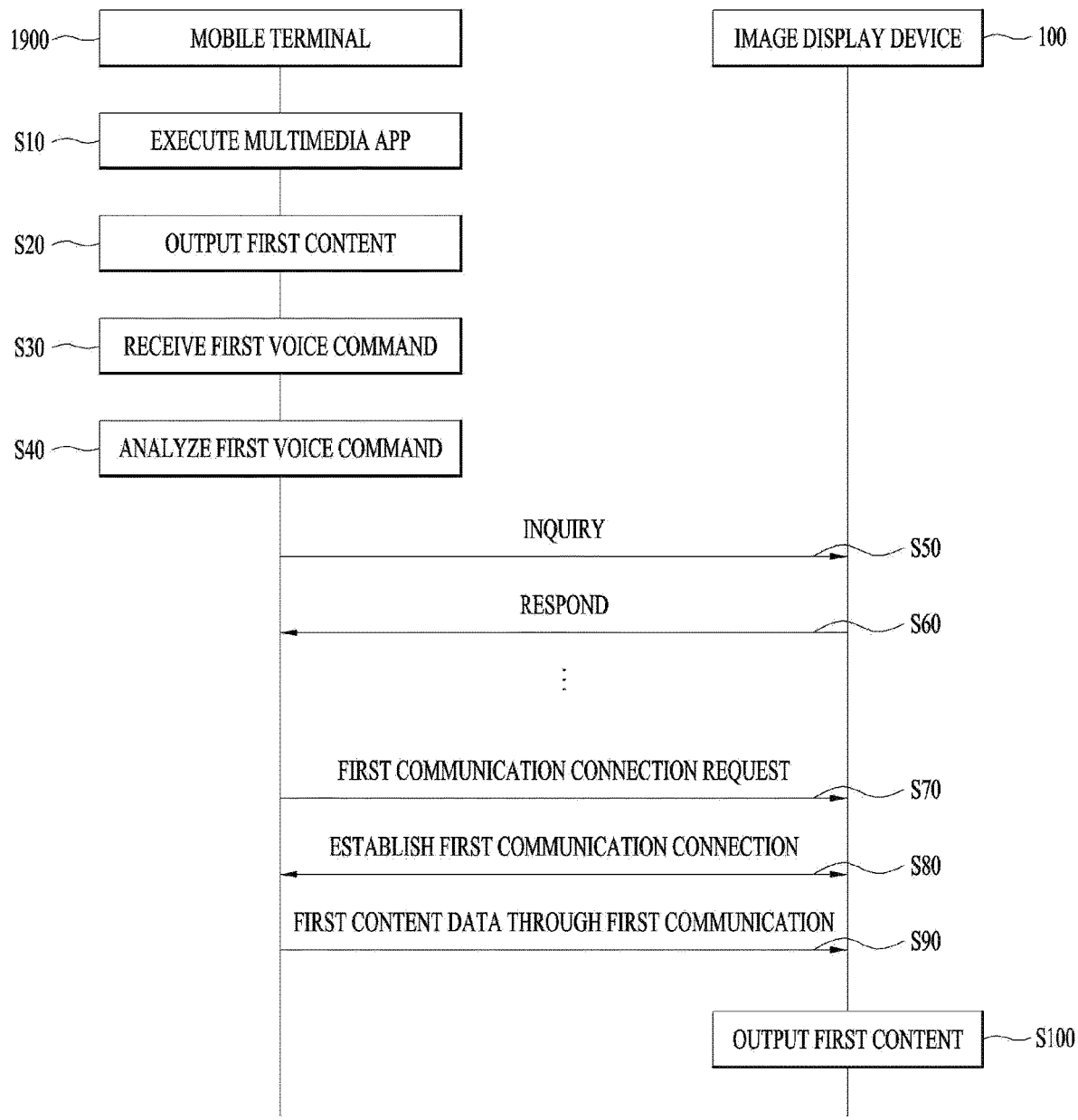
FIG. 18 is a flowchart in which an image display device and a mobile terminal are in association with each other according to the present invention.
Figure 19:
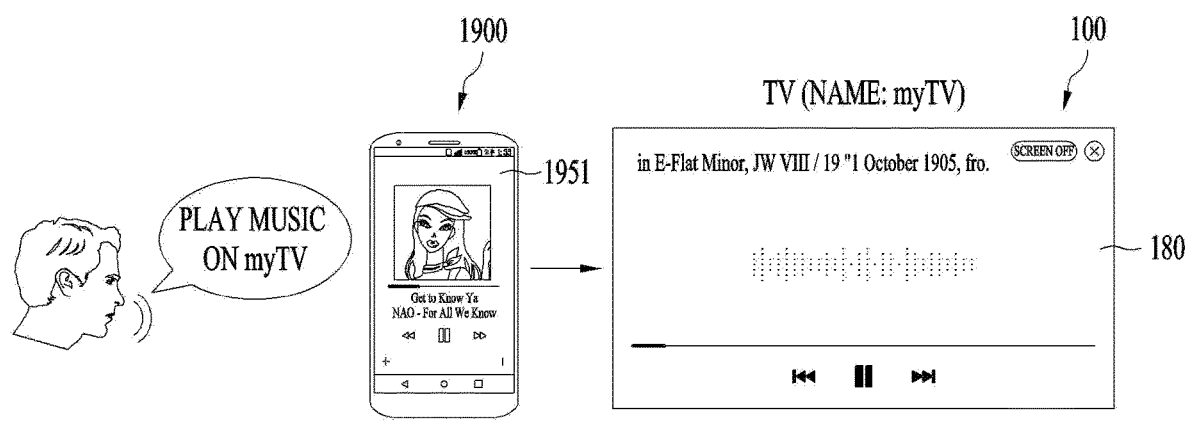
FIG. 19 shows an image display device and a mobile terminal in association with each other according to the present invention.

First, with reference to FIGS. 18 and 19, a description will be given of the association between the image display device and the mobile terminal according to the present invention. FIG. 18 is a flowchart in which an image display device and a mobile terminal are in association with each other according to the present invention, and FIG. 19 shows an image display device and a mobile terminal in association with each other according to the present invention.

A multimedia application (hereinafter, referred to as an app) may be executed on the mobile terminal 1900 such as the smartphone, the tablet PC, and the like [S10]. The multimedia app may be understood as an app for executing multimedia content such as audio content (e.g., music or the like) and video content (e.g., movie or the like). The multimedia content may be stored in the mobile terminal or may be received from an external server through a streaming service.

Hereinafter, for simplicity of description, it is assumed that the multimedia app is a music app.

As the music app is executed on the mobile terminal 1900, an execution screen of the music app may be displayed on the display unit 1951 of the mobile terminal 1900. In addition, the mobile terminal 1900 may output first content (i.e., first music) in a playlist of the music app [S20]. In this connection, the playlist means a list in which a variety of content are arranged to be continuously played in a predetermined order in the music app. There may be only one content or a plurality of content in the playlist.

While the first content is being output, a voice recognition function for receiving a user voice command from the mobile terminal 1900 may be activated. The voice recognition function may be activated as a preset user command (e.g., menu icon manipulation or key button manipulation) is input to the mobile terminal 1900 while or before the music app is being executed. Alternatively, the voice recognition function may be activated by default when the mobile terminal 1900 is turned on.

After the voice recognition function is activated, as shown in FIG. 19, the mobile terminal 1900 may receive a first voice command through the microphone 1922 [S30]. The first voice command may be, for example, "Play music on myTV".

Then, the controller 1980 of the mobile terminal 1900 may analyze the first voice command to identify a user's intention of the first voice command, that is, that the user wants to output the first music from the image display device 100 having a device name "myTV" [S40]. An AI (Artificial Intelligence) may be used to analyze the first voice command.

The user does not necessarily have to input the voice command to output the first music from the image display device 100. For example, the mobile terminal 1900 may also receive the command through the preset user command (e.g., the menu icon manipulation or the key button manipulation) rather than the voice.

Then, the controller 1980 of the mobile terminal 1900 may broadcast an inquiry for searching the image display device 100 having the device name through the wireless communication module 1910 [S50].

Then, the wireless communication module (not shown) of the image display device 100 may receive the inquiry, and transmit a response to the inquiry to the mobile terminal 1900 [S60]. Before receiving the inquiry, the image display device 100 may be turned on in advance, or may be in a state in which main power is turned off, and power is supplied only to minimum components for receiving the inquiry.

By receiving the response to the inquiry, the mobile terminal 1900 may search for the image display device 100 having the device name.

Accordingly, the controller 1980 of the mobile terminal 1900 may transmit a first communication connection request to the image display device 100 [S70].

Accordingly, a first communication connection may be established between the mobile terminal 1900 and the image display device 100 [S80].

Then, the mobile terminal 1900 may transmit data of the first content currently being output to the image display device 100 through the first communication [S90].

Then, the image display device 100 may receive the data of the first content and output the first content [S100]. When the data of the first content is data decoded by the mobile terminal, the image display device 100 may output the first content data without a need to execute a separate app. However, when the data of the first content is data that has not been decoded by the mobile terminal 1900, the image display device 100 may execute a multimedia app for decoding the data, then decode the data, and then output the first content.

In addition, as shown in FIG. 19, the controller 170 of the image display device 100 may output a user interface for outputting information (e.g., a music title or the like) of the first content information and/or displaying a play control icon (e.g., a "stop" icon, a "play" icon, a "previous song" icon, a "next song" icon, or the like) of second content through the display unit 180.

The first communication may be one of the short-range wireless communication described above. Hereinafter, a description will be made assuming that the first communication is a Bluetooth (but is not limited thereto).

The Bluetooth includes a low energy Bluetooth mode and a classic Bluetooth mode. The low energy Bluetooth mode is characterized by a low transmission speed but a low power consumption. The classic Bluetooth mode is characterized by a higher transmission speed, but a higher power consumption than those of the low energy Bluetooth mode.

It will be assumed that the first communication is the classic Bluetooth (but is not limited thereto).

That is, according to the present invention, the image display device 100 may serve as a Bluetooth content output device (e.g., a Bluetooth speaker) of the mobile terminal 1900.

Figure 20:
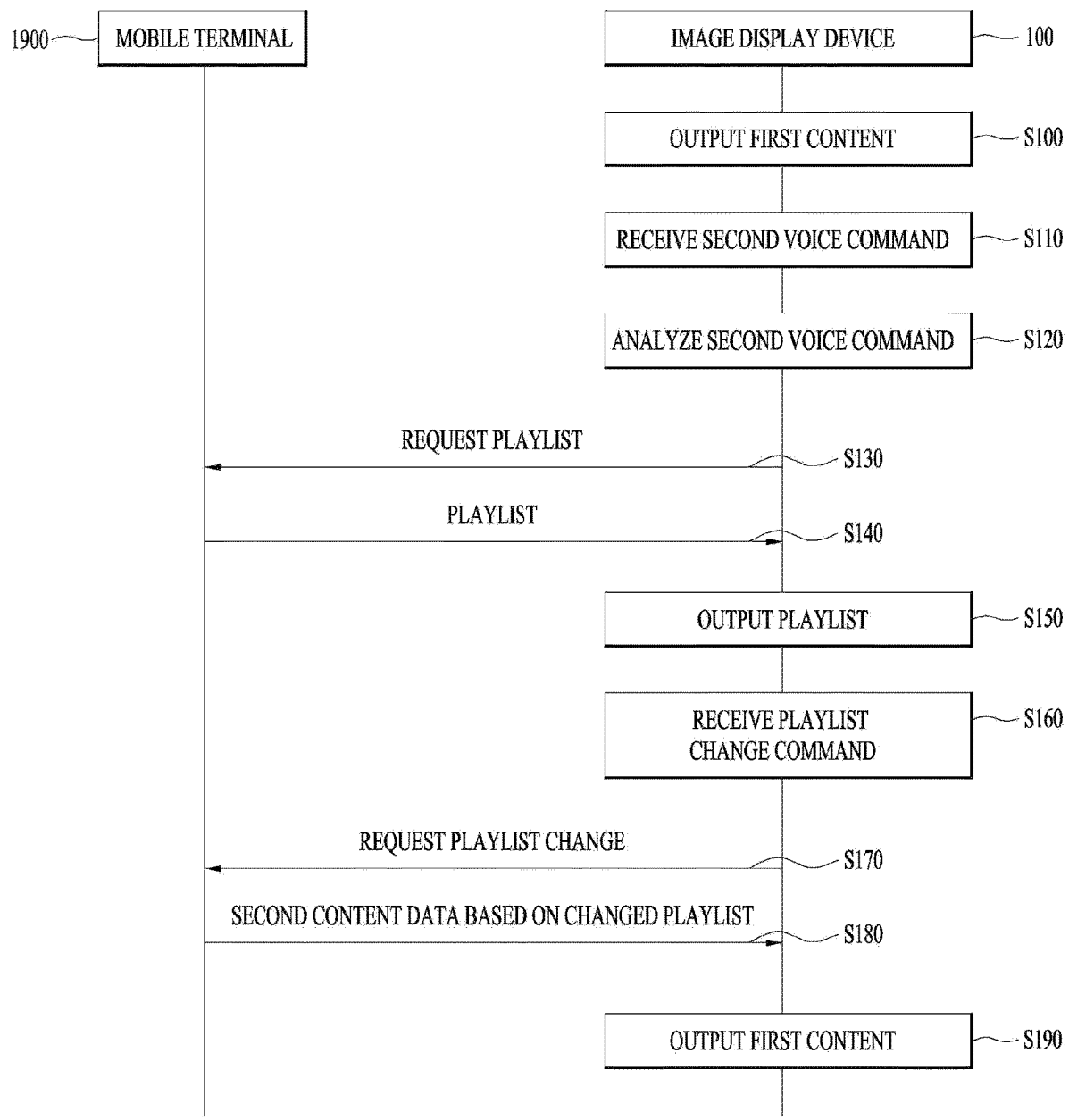
FIG. 20 is a flowchart in which an image display device and a mobile terminal are in association with each other according to the present invention.
Figure 21:
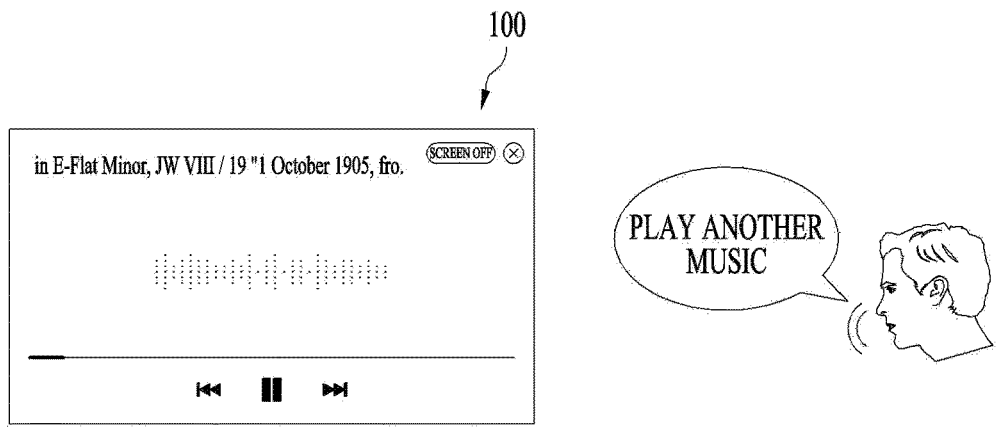
FIGS. 21 and 22 show an image display device and a mobile terminal in association with each other according to the present invention.

While the first content is being output through the image display device 100, the user may also control the multimedia app being executed on the mobile terminal 1900 through the image display device 100. This will be described with further reference to FIGS. 20 to 22. FIG. 20 is a flowchart in which an image display device and a mobile terminal are in association with each other according to the present invention, and FIGS. 21 and 22 show an image display device and a mobile terminal in association with each other according to the present invention.

As described above, the image display device 100 may output the first content transmitted through the first communication from the mobile terminal 1900 [S100].

In the image display device 100, the voice recognition function for receiving the user voice command may be activated. The voice recognition function may be activated as the preset user command (e.g., the key button manipulation in the remote controller 200) is input to the image display device 100 while or before first content is being output. Alternatively, the voice recognition function may be activated by default when the image display device 100 is turned on.

Figure 22:
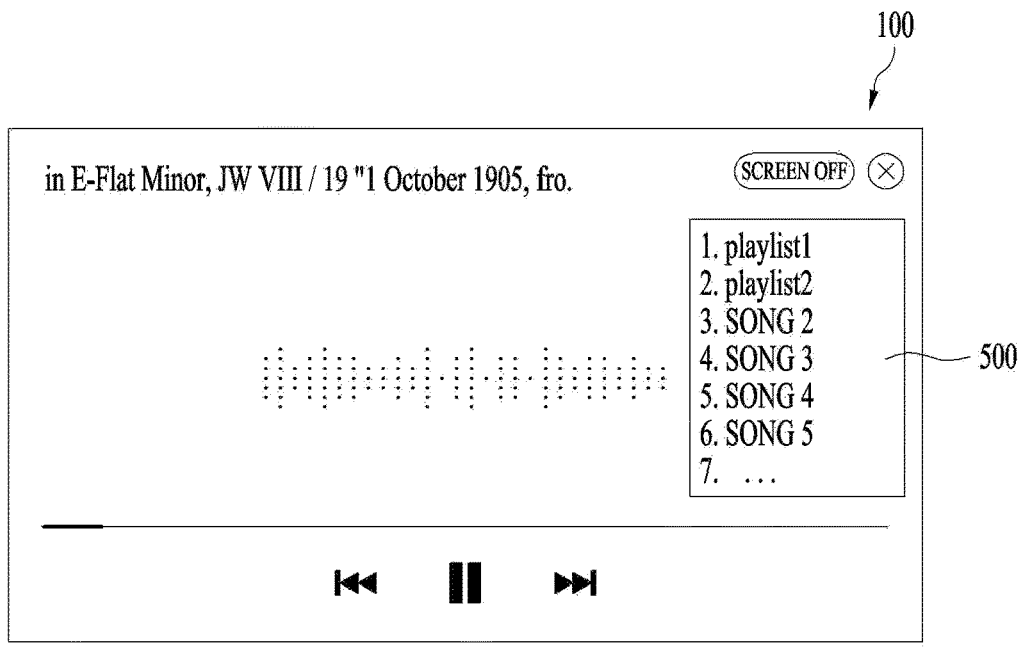

After the voice recognition function is activated, the image display device 100 may receive a second voice command as shown in FIG. 22 [S110]. The first voice command may be, for example, "play another music". The first voice command may be input through a microphone (not shown) equipped in the image display device 100 or through a microphone (not shown) equipped in the remote controller 200 and transmitted to the image display device 100.

Then, the controller 170 of the image display device 100 may analyze the second voice command to identify a user's intention of the second voice command, that is, that the user wants to output another content (i.e., another music) from the image display device 100 [S120]. The artificial intelligence (AI) may be used to analyze the second voice command.

The user does not necessarily have to input the voice command to output another content from the image display device 100. For example, the image display device 100 may also receive the command through the preset user input (e.g., the key button manipulation of the remote controller 200) rather than the voice.

Then, the controller 170 of the image display device 100 may request the playlist from the mobile terminal 1900 [S130].

A signal for requesting the playlist may be transmitted from the image display device 100 to the mobile terminal 1900 through the first communication. As an example, the signal for requesting the playlist may be transmitted through the Bluetooth communication (not limited thereto) based on an audio/video remote control profile (AVRCP) of the classic Bluetooth mode.

In the Bluetooth communication, a "profile" may be understood as defining a type and a structure of a Bluetooth protocol that should be used for each specific application when implementing a Bluetooth application. The AVRCP is a profile defined for controlling audio and video functions between two devices between which the Bluetooth communication is performed.

The mobile terminal 1900 that has received the request may transmit the playlist to the image display device 100 [S140]. The playlist may be transmitted through the first communication (not limited thereto) described above.

As shown in FIG. 22, the controller 170 of the image display device 100 may control to display a transmitted playlist 500 [S150].

The user may input a command for changing the playlist (e.g., changing a playback order) to the image display device 100 by selecting desired content while viewing the playlist 500. That is, the image display device 100 may receive a playlist change command from the user [S160].

The playlist change command may be input through the voice recognition function described above, or may be input through the manipulation of the key in the remote controller 200.

In addition, the image display device 100 may transmit the playlist change command to the mobile terminal 1900 [S170]. The playlist change command between the image display device 100 and the mobile terminal 1900 may be transmitted through the first communication, for example, based on the AVRCP of the classic Bluetooth mode.

Then, the mobile terminal 1900 may change the playlist in response to the playlist change command, and transmit data of the second content (e.g., second music) based on the changed playlist to the image display device 100 [S180].

The second content data may be transmitted from the mobile terminal 1900 to the image display device 100 through the first communication, for example, based on the advanced audio distribution profile (A2DP) of the classic Bluetooth mode. The A2DP is a profile related to transmission of multimedia audio (especially high-quality audio) from one device to another device.

Then, the image display device 100 may receive the data of the second content and output the second content instead of the first content [S190]. The content output and the user interface for the content output are the same as described above, so that detailed descriptions thereof will be omitted.

The outputting of another content using the playlist transmitted from the mobile terminal 1900 to the image display device 100 in response to the second voice command has been described above. However, the present invention is not necessarily limited to the playlist. A content list other than the playlist may be transmitted from the mobile terminal 1900 to the image display device 100 in response to the second voice command. The content list refers to a list in which a variety of content playable by the mobile terminal 1900 are arranged in an order of a file name or a file creation date regardless of the playback order, which may refer to a content folder itself.

The image display device 100 may display the content list instead of the playlist. When desired content is selected from the content list by the user, the image display device 100 may transmit a selected content request command instead of the playlist change command to the mobile terminal 1900, and receive data of the selected content from the mobile terminal 1900 and output the data.

Hereinabove, the outputting of the content desired by the user through the image display device 100 by controlling, by the user, the mobile terminal 1900 through the playlist or the content list displayed on the image display device 100 has been described.

Figure 23:
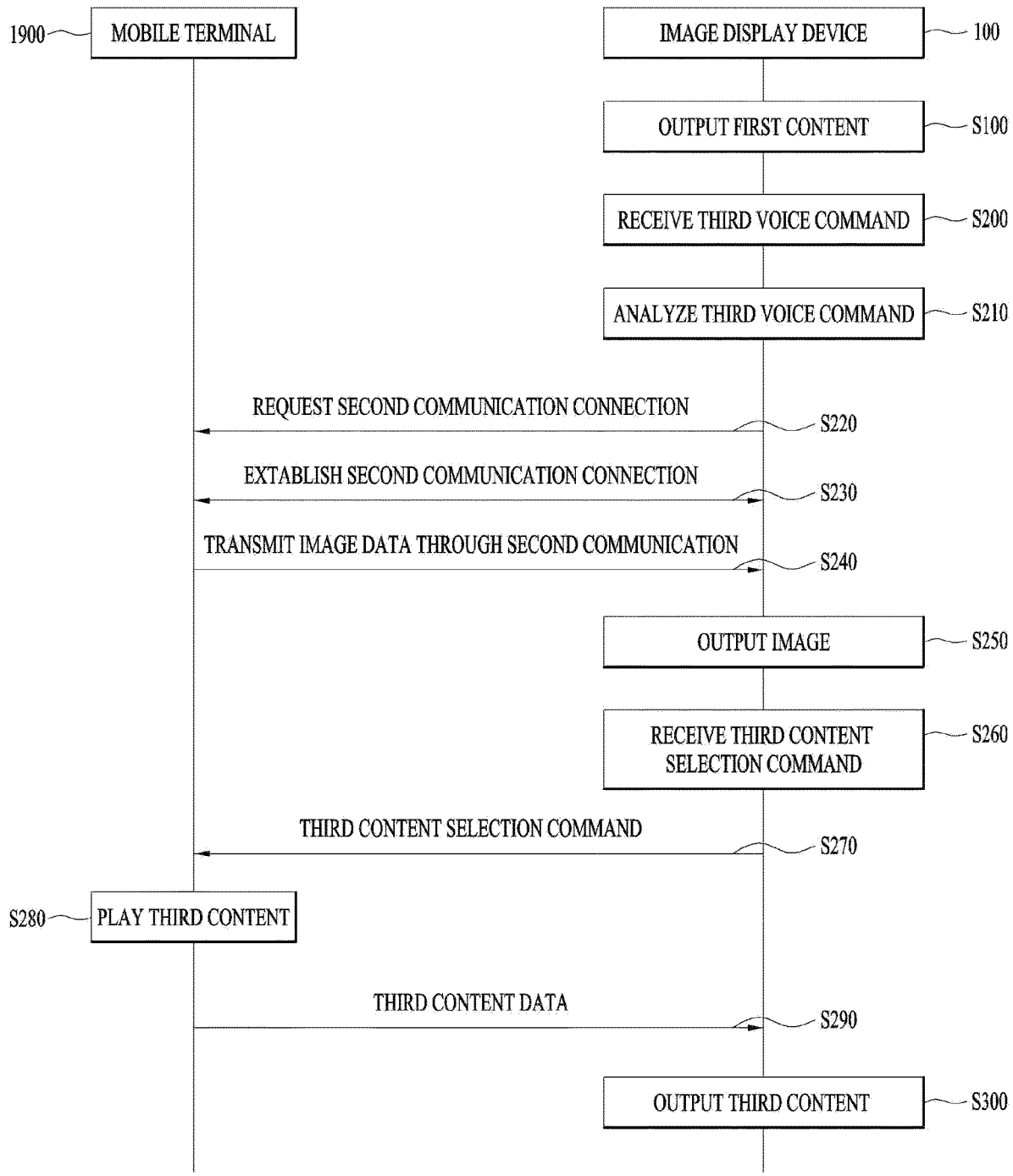
FIG. 23 is a flowchart in which an image display device and a mobile terminal are in association with each other according to the present invention.

Hereinafter, the content desired by the user may be output through the image display device 100 by controlling, by the user, the mobile terminal 1900 through a screen image of the mobile terminal 1900 that is mirrored and displayed on the image display device 100. This will be described with reference to FIGS. 23 to 25. FIG. 23 is a flowchart in which an image display device and a mobile terminal are in association with each other according to the present invention, and FIGS. 24 and 25 show an image display device and a mobile terminal in association with each other according to the present invention.

As described above, the image display device 100 may output the first content transmitted through the first communication from the mobile terminal 1900 [S100].

In the image display device 100, the voice recognition function for receiving the user voice command may be activated. Because this is the same as described above, a detailed description thereof will be omitted.

Figure 24:
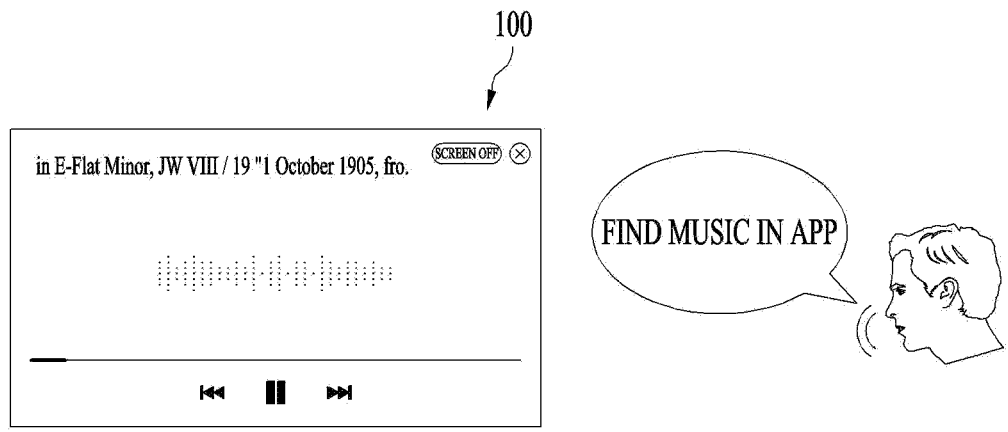
FIGS. 24 and 25 show an image display device and a mobile terminal in association with each other according to the present invention.
Figure 25:
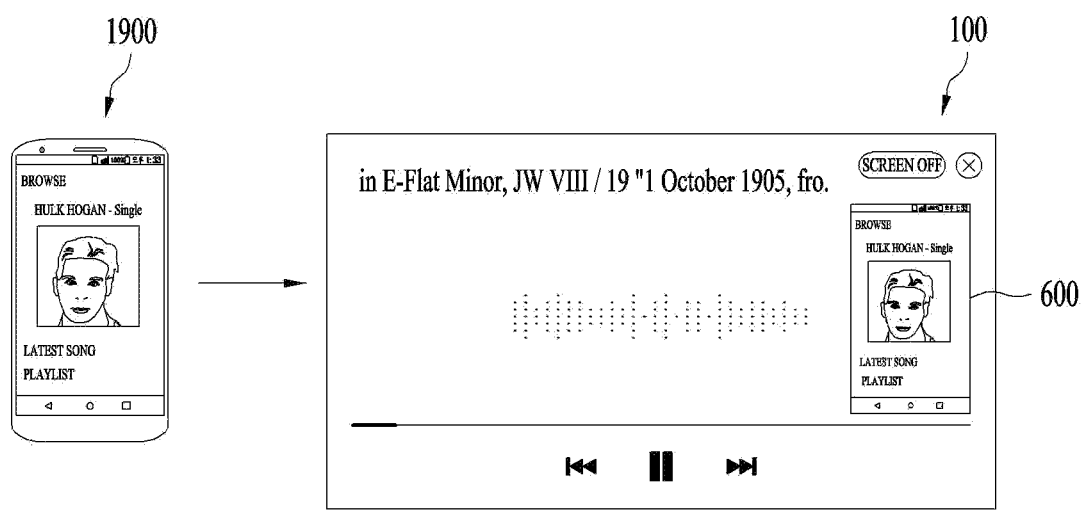

After the voice recognition function is activated, the image display device 100 may receive the third voice command as shown in FIG. 24 [S200]. The third voice command may be, for example, "Find music in an app". The third voice command may be input through the microphone (not shown) equipped in the image display device 100 or through the microphone (not shown) equipped in the remote controller 200 and transmitted to the image display device 100.

Then, the controller 170 of the image display device 100 may analyze the third voice command to identify a user's intention of the third voice command, that is, that the user wants to search for another content through an execution screen of the multimedia app being executed on the mobile terminal [S210]. The artificial intelligence (AI) may be used to analyze the third voice command.

The user does not necessarily have to input the voice command to search for another content through the execution screen of the multimedia app in the image display device 100. For example, the image display device 100 may also receive the command through the preset user input (e.g., the manipulation of the key button of the remote controller 200) rather than the voice.

Then, the controller 170 of the image display device 100 may transmit a second communication connection request for transmitting the execution screen of the multimedia app to the mobile terminal 1900 through the first communication (e.g., the low energy Bluetooth mode) [S220]. The second communication connection request may also include a request to transmit the execution screen of the multimedia app.

Accordingly, a second communication connection may be established between the image display device 100 and the mobile terminal 1900 [S230]. Even when the second communication is connected, the first communication is still maintained, so that the image display device 100 may receive the first content data through the first communication and continue to output the first content.

The mobile terminal 1900 may transmit image data of the execution screen of the multimedia app to the image display device 100 through the second communication [S240]. The image data may be a mirroring screen of the mobile terminal 1900.

When the image data of the execution screen of the multimedia app is able to be transmitted through the first communication, operations S220 and S230 for the second communication connection may be omitted. Thereafter, the communication between the image display device 100 and the mobile terminal 1900 may be performed through the first communication.

The second communication may be one of the short-range wireless communication described above. Hereinafter, a description will be made assuming that the second communication is the Wi-Fi communication (but is not limited thereto).

When the second communication is the Wi-Fi communication, in a case in which the image display device 100 requests the second communication connection in operation S220, a WiFi MAC address for the second communication connection may also be transmitted to the mobile terminal.

The mirroring screen of the mobile terminal 1900 may be transmitted from the mobile terminal 1900 to the image display device 100 based on a Miracast standard. That is, the second communication connection request described above may be understood as a Miracast triggering request from the image display device 100 to the mobile terminal 1900.

As shown in FIG. 25, the image display device 100 may display an execution screen 600 of the multimedia app to be overlapped on the user interface [S250]. Although not shown, the image display device 100 may output only the execution screen 600 of the multimedia app without displaying the user interface.

The user may input a command for selecting desired content (hereinafter, referred to as third content) to the image display device 100 while viewing the execution screen 600. That is, the image display device 100 may receive a third content selection command from the user [S260]. The third content selection command may be coordinate information (not limited thereto) at which the third content is displayed on the execution screen 600.

The third content selection command may be input through the voice recognition function described above, or may be input through the manipulation of the key button equipped in the remote controller 200.

Then, the image display device 100 may transmit the third content selection command to the mobile terminal 1900 through the second communication, for example, through a User Input Back Channel (UIBC) of the Miracast standard, that is, a Miracast standard user input back channel [S270].

The mobile terminal 1900 may execute the third content in response to the transmitted third content selection command, and transmit data of the third content to the image display device 100 [S290]. When the third content is the audio content such as the music, for example, the third content may be transmitted through the first communication.

Then, the image display device 100 may receive the data of the third content and output the third content instead of the first content [S300]. The content output and the user interface therefor are the same as described above, so that detailed descriptions thereof will be omitted.

Figure 26:
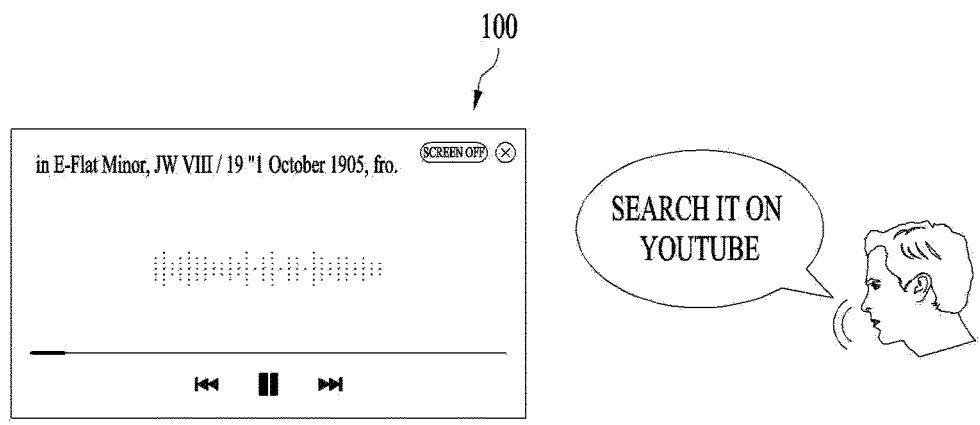
FIGS. 26 and 27 show an image display device according to the present invention.
Figure 27:
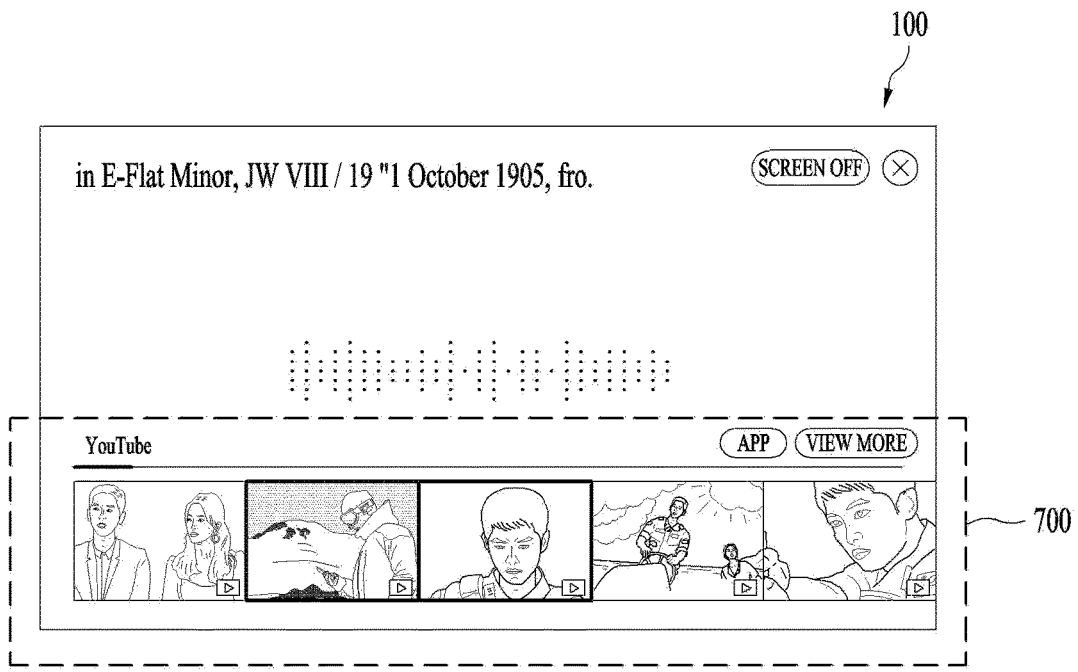

Hereinafter, with reference to FIGS. 26 and 27, an Internet search by analyzing content being output from the image display device 100 will be described. FIGS. 26 and 27 show an image display device according to the present invention.

As described above, the image display device 100 may output the first content transmitted from the mobile terminal 1900 through the first communication.

The voice recognition function for receiving the user voice command from the image display device 100 may be activated. Because this is the same as described above, a detailed description thereof will be omitted.

After the voice recognition function is activated, the image display device 100 may receive a fourth voice command as shown in FIG. 26. The fourth voice command may be, for example, "Search it on YouTube". The fourth voice command may be input through the microphone (not shown) equipped in the image display device 100 or may be input through the microphone (not shown) equipped in the remote controller 200 and transmitted to the image display device 100.

Then, the controller 170 of the image display device 100 may analyze the fourth voice command to identify a user's intention of the fourth voice command, that is, that the user wants to search the first content currently being output on a search engine such as YouTube. The artificial intelligence (AI) may be used to analyze the fourth voice command.

The user does not necessarily have to input the voice command to search the first content on the search engine in the image display device 100. For example, the image display device 100 may also input the command through the preset user input (e.g., the manipulation of the key button of the remote controller 200) rather than the voice.

Then, the controller 170 of the image display device 100 may execute a search engine app (e.g., a YouTube app), perform the search on the search engine app using at least one of a digital music file and metadata (e.g., a content title, a creator, and the like) of the first content, and overlap and display a search result list 700 on the user interface as shown in FIG. 27. Although not shown, the image display device 100 may output only the search result list 700 without displaying the user interface.

When one item is selected from the search result list, the image display device 100 may execute and output the selected item through the executed search engine app. At this time, the output of the first content may be stopped or the first content may be output together through multitasking.

In the above, the search, performed by the image display device 100, using the at least one of the digital music file and the metadata of the first content received from the mobile terminal 1900 through the first communication in the case in which the image display device 100 and the mobile terminal 1900 are connected to each other through the first communication has been described. However, the image display device 100 and the mobile terminal 1900 do not necessarily have to be connected to each other through the first communication for the search.

For example, in the image display device 100, when the controller 170 receives a fourth voice command, the microphone (not shown) equipped in the image display device 100 or the microphone (not shown) equipped in the remote controller 200 may be continuously activated.

In addition, the image display device 100 may receive sound output through a speaker 1952 of the mobile terminal 100 through the microphone.

Then, the controller 170 of the image display device 100 may analyze a waveform signal of the received sound to identify information on the first content (e.g., the metadata of the first content) being output from the mobile terminal 100. Alternatively, the controller 170 of the image display device 100 may transmit the waveform signal of the received sound through an Internet network to an external server (e.g., a Naver music search service server) (not shown), and receive the information on the first content (e.g., the metadata of the first content) from the external server.

Then, the image display device 100 may perform the search on the search engine app using the information on the first content, and overlap and display the search result list 700 on the user interface as shown in FIG. 27. Although not shown, the image display device 100 may output only the search result list 700 without displaying the user interface.

When one item is selected from the search result list, the image display device 100 may execute and output the selected item through the executed search engine app. At this time, the output of the first content may be stopped or the first content may be output together through the multitasking.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal. The foregoing embodiments are merely exemplary and are not to be considered as limiting the present disclosure. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

The invention claimed is:

1. An image display device comprising:
a display unit;
an audio output unit;
a wireless communication module for a communication between a mobile terminal and a remote controller;
a controller configured to perform control to:
establish a first communication connection with the mobile terminal in response to a first communication connection request received through the wireless communication module from the mobile terminal playing first content;
receive the first content from the mobile terminal through a first communication and output the first content through the audio output unit; and
display a user interface for controlling playback of the first content of the mobile terminal on the display unit,
wherein the controller is configured to perform control to:
establish a second communication connection while the first communication is connected;
display an execution screen of the mobile terminal to be mirrored on the display unit through a second communication while receiving the first content from the mobile terminal through the first communication;
transmit a user command for selecting third content on the mirrored execution screen to the mobile terminal through the second communication; and
receive the third content from the mobile terminal through the first communication and output the third content through the audio output unit.

2. The image display device of claim 1, wherein the controller is configured to perform control to receive a content playlist through the first communication from the mobile terminal and display the content playlist to be overlapped on the user interface.

3. The image display device of claim 2, wherein the controller is configured to:
request a playback order change of the playlist through the first communication to the mobile terminal in response to a user command for changing the playback order of the playlist; and
receive second content resulted from the playback order change from the mobile terminal through the first communication and output the second content through the audio output unit.

4. The image display device of claim 3, wherein the first communication is a Bluetooth communication, and the playlist is transmitted based on an audio/video remote control profile (AVRCP).

5. The image display device of claim 4, wherein the first content and the second content are transmitted based on an advanced audio distribution profile (A2DP) of the Bluetooth communication.

6. The image display device of claim 1, wherein the second communication is a Wi-Fi communication, and the execution screen is mirrored based on a Miracast standard.

7. The image display device of claim 6, wherein the user command for selecting the third content is transmitted through a user input back channel (UIBC) of the Miracast standard.

8. The image display device of claim 1, wherein the controller is configured to perform control to perform a search by analyzing a digital music file of the first content and display a search result to be overlapped on the user interface.

9. A method for controlling an image display device, the method comprising:
- establishing a first communication connection with a mobile terminal in response to a first communication connection request received from the mobile terminal playing first content;
- receiving the first content from the mobile terminal through a first communication and outputting the first content through an audio output unit;
- displaying a user interface for controlling playback of the first content of the mobile terminal;
- establishing a second communication connection while the first communication is connected;
- displaying an execution screen of the mobile terminal to be mirrored on a display unit through the second communication while receiving the first content from the mobile terminal through the first communication;
- transmitting a user command for selecting third content on the mirrored execution screen to the mobile terminal through a second communication; and
- receiving the third content from the mobile terminal through the first communication and outputting the third content through the audio output unit.

10. The method of claim 9, further comprising:
receiving a content playlist through the first communication from the mobile terminal and displaying the content playlist to be overlapped on the user interface.

11. The method of claim 10, further comprising:
- requesting a playback order change of the playlist through the first communication to the mobile terminal in response to a user command for changing the playback order of the playlist; and
- receiving second content resulted from the playback order change from the mobile terminal through the first communication and outputting the second content through the audio output unit.

12. The method of claim 11, wherein the first communication is a Bluetooth communication, and the playlist is transmitted based on an audio/video remote control profile (AVRCP).

13. The method of claim 12, wherein the first content and the second content are transmitted based on an advanced audio distribution profile (A2DP) of the Bluetooth communication.

14. The method of claim 11, wherein the second communication is a Wi-Fi communication, and the execution screen is mirrored based on a Miracast standard.

15. The method of claim 14, wherein the user command for selecting the third content is transmitted through a user input back channel (UIBC) of the Miracast standard.

16. The method of claim 9, further comprising:
performing a search by analyzing a digital music file of the first content and displaying the search result to be overlapped on the user interface.

* * * * *